United States Patent
Hafid et al.

(10) Patent No.: US 8,547,827 B2
(45) Date of Patent: *Oct. 1, 2013

(54) DYNAMIC TRAFFIC REARRANGEMENT AND RESTORATION FOR MPLS NETWORKS WITH DIFFERENTIATED SERVICES CAPABILITIES

(75) Inventors: Abdelhakim Hafid, North Plainfield, NJ (US); Narayanan Natarajan, Marlboro, NJ (US); Shrirang Gadgil, Eatontown, NJ (US)

(73) Assignee: MOSAID Technologies Incorporated, Ottawa (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,520

(22) Filed: Apr. 17, 2012

(65) Prior Publication Data

US 2012/0201132 A1 Aug. 9, 2012

Related U.S. Application Data

(63) Continuation of application No. 11/048,370, filed on Jan. 31, 2005, now Pat. No. 8,179,786.

(60) Provisional application No. 60/572,512, filed on May 19, 2004.

(51) Int. Cl.
*G01R 31/08* (2006.01)
*H04L 1/00* (2006.01)
*H04L 12/28* (2006.01)
*H04J 3/16* (2006.01)

(52) U.S. Cl.
USPC ............ 370/216; 370/242; 370/400; 370/469

(58) Field of Classification Search
None
See application file for complete search history.

(56) References Cited

U.S. PATENT DOCUMENTS

| | | | |
|---|---|---|---|
| 6,725,401 | B1 | 4/2004 | Lindhorst-Ko |
| 6,738,348 | B1 | 5/2004 | Rollins |
| 7,124,187 | B1 | 10/2006 | Kodialam et al. |

(Continued)

FOREIGN PATENT DOCUMENTS

WO 03062947 7/2003

OTHER PUBLICATIONS

Autenrieth A et al., "RD-QoS—the integrated provisioning of resilience and QoS in MPLS-based Networks", Proceedings of the IEEE International, Apr. 28, 2002-May 2, 2002.

(Continued)

*Primary Examiner* — Faruk Hamza
*Assistant Examiner* — Cassandra Decker
(74) *Attorney, Agent, or Firm* — Don Mollick

(57) ABSTRACT

At least one substitute path is provided in place of a plurality of existing paths of a network to reallocate traffic carried by the plurality of existing paths. The total bandwidth needed to carry the traffic of the plurality of existing paths is determined. A proposed route is generated from the available links in the network. A portion of the bandwidth of a proposed route may be allocated to the needed bandwidth when the bandwidth of a proposed route is greater than or equal to the needed bandwidth. When the bandwidth of the proposed route is less than the needed bandwidth, at least one further route is generated, and the needed bandwidth is divided among the proposed route and the at least one further route such that a minimum number of further routes are generated.

13 Claims, 12 Drawing Sheets

(56) References Cited

U.S. PATENT DOCUMENTS

| | | | |
|---|---|---|---|
| 2002/0087713 | A1 | 7/2002 | Cunningham |
| 2002/0143928 | A1 | 10/2002 | Maltz et al. |
| 2003/0126287 | A1 | 7/2003 | Charney et al. |
| 2004/0004938 | A1 | 1/2004 | Buddhikot et al. |
| 2004/0052207 | A1 | 3/2004 | Charney et al. |
| 2004/0264500 | A1* | 12/2004 | Bansal et al. ............ 370/468 |
| 2005/0050246 | A1 | 3/2005 | Lakkakorpi et al. |
| 2005/0111375 | A1 | 5/2005 | Ravindran et al. |
| 2005/0143711 | A1 | 6/2005 | Otsubo et al. |
| 2005/0174934 | A1 | 8/2005 | Kodialam et al. |
| 2005/0180335 | A1 | 8/2005 | Lee |
| 2005/0201273 | A1 | 9/2005 | Shimizu |
| 2005/0265228 | A1 | 12/2005 | Fredette et al. |
| 2005/0270972 | A1 | 12/2005 | Kodialam et al. |

OTHER PUBLICATIONS

EP Application No. 05744469 Supplementary European Search Report dated Jun. 4, 2010.

Rarneshbabu Prabagaran et al., "Experiences with Class of Service (CoS) Translations in IPIMPLS Networks", 0-7695-1321-2101 $10.00 O 2001 IEEE, Nov. 14-16, 2001.

Norashidah Md Din et al., "Dynamic Resource Allocation of IP Traffic for a DiffServ-MPLS Interface using Fuzzy Logic", 0-7803-8114-9/03/$17.00 02003 IEEE, May 25-28, 2003.

Murali Kodialam T.V. Lakshman, "Dynamic Routing of Locally Restorable Bandwidth Guaranteed Tunnels using Aggregated Link Usage Information", 0-7803-7016-3/01/$10.00 © 2001 IEEE, Apr. 22-26, 2001.

Veselin Rakocevic et al., "Dynamic Partitioning of Link Bandwidth in IPMPLS Networks", 0-7803-7097-1/01/$10.0002 001 IEEE, Jun. 11-14, 2001.

Shin-Ichi Kuribayashi et al., "Optimal LSP selection method in MPLS networks", 1-4244-1190-4/07/$25.00 © 2007 IEEE, Sep. 2007.

Bong-Soo You et al., "Traffic Engineering using a Heuristic Multi-Path Routing Strategy in MPLS Network", 1-4244-0574-2/06/$20.00 (0)2006 IEEE, Aug. 2006.

Dahai Xu, "Novel Algorithms for Shared Segment Protection", 0733-8716/03$17.00 © 2003 IEEE, Oct. 2003.

* cited by examiner

DYNAMIC TRAFFIC REARRANGEMENT AND RESTORATION FOR MPLS NETWORKS WITH DIFFERENTIATED SERVICES CAPABILITIES

CROSS-REFERENCE TO RELATED APPLICATIONS

This application is a continuation of Ser. No. 11/048,370 filed Jan. 31, 2005, which claims the benefit of U.S. Provisional Application No. 60/572,512, filed May 19, 2004, the disclosures of which are incorporated herein by reference.

BACKGROUND OF THE INVENTION

The present invention is directed to networks used for forwarding information packets and, more particularly, to networks which incorporate multi-protocol label switching (MPLS).

Networks that use multi-protocol label switching (MPLS) permit the transfer of packets through the network via an end-to-end connection path that is determined before the packets are transferred through the network. When a packet enters the MPLS network, the packet is assigned a "label" by an ingress router, also known as a label edge router (LER), which also attaches the label to the packet and forwards the packet to the first one of a series of routers, known as label switch routers (LSRs), that forward the packet along the connection path. The label includes information that is used by the first router to determine the next router to which the packet is to be forwarded. The first router then receives the packet, removes the label, and then attaches a new label that is to be used by the next router to determine the subsequent router to which the packet is to be switched. This process is repeated for each router located along the connection path. Namely, each router along the path receives the packet with a label attached by the immediately preceding router, uses the information contained in the label to determine the next router to receive the packet, strips the current label, applies a new label that is to be used by the succeeding router, and then forwards the packet to that router. The process ends when the packet is delivered to the last router along the path, also known as an egress router or an LER.

Because labels are used to determine how each router forwards packets along the connection path, also known as forwarding traffic, the connection path is also known as a label-switched path (LSP). Each label contains information about only a portion of the LSP, and each router or switch need only store information regarding the route corresponding to a particular label and store the next label to be attached to the packet.

The specific routes that comprise the LSP are typically determined based on a variety of reasons, such as to guarantee a certain level of performance, to route around network congestion, or to comply with the requirements of the specific application. One or more backup LSPs are also typically determined at the same time when a primary LSP is set up. The routes for the backup paths may be determined either statically during the primary LSP set up or may be determined dynamically only upon a primary LSP failure. The backup paths typically have the same bandwidth as the primary LSP.

When a failure occurs in the network, such as when a router failure, a router interface failure or a link failure occurs, the packets that were carried over the failed LSP are switched over to one of its corresponding backup LSPs. Sometimes, however, the network failure may also cause a failure of the primary LSP and its backup LSP. The present MPLS network recovery schemes do not address such situations.

It is therefore desirable to have a traffic restoration scheme that handles such situations in order to increase network availability and service availability. It is also desirable to have such a scheme create one or more replacement LSPs that carries as much of the traffic as possible that was carried by the failed LSP. It is further desirable that the restoration scheme creates replacement LSPs by considering efficient utilization of network resources and using traffic engineering policies.

SUMMARY OF THE INVENTION

According to a method of the invention, at least one substitute path is provided in place of a plurality of existing paths of a network to reallocate traffic carried by the plurality of existing paths. The method includes: determining total bandwidth needed to carry the traffic of the plurality of existing paths; generating a proposed route from the available links in the network; and allocating a portion of the bandwidth of the proposed route to the needed bandwidth when the bandwidth of the proposed route is greater than or equal to the needed bandwidth.

In accordance with the above method of the invention, each of the plurality of existing paths may include at least one failed link. The network may include a multiprotocol label switching (MPLS) network, and the plurality of existing paths and the plurality of substitute paths may each be respective pluralities of label-switched paths (LSPs). The proposed route may be a route having the maximum available bandwidth.

The plurality of existing paths may carry traffic of a plurality of service classes, the above determining step may include determining a plurality of the needed bandwidths corresponding to the plurality of service classes, and the allocating step may include allocating the portion of the bandwidth of the proposed route to a selected element in the plurality of needed bandwidths and assigning the traffic of its corresponding class to the proposed route when the bandwidth of the proposed route is greater than or equal to the selected bandwidth element. The selected bandwidth element may be the largest non-allocated bandwidth element in the plurality of needed bandwidths. The method may also include allocating a part of a remaining portion of the bandwidth of the proposed route to another bandwidth element, e.g., referred to as X, in the plurality of needed bandwidths and assigning the traffic of the corresponding class to the proposed route when the remaining portion of the bandwidth of the proposed route is greater than or equal to the bandwidth value of X. The bandwidth element X may be the largest one of the remaining non-allocated bandwidth elements in the plurality of needed bandwidths and that has a bandwidth less than or equal to the remaining portion of the bandwidth of the proposed route.

The method may further allocating, in order of decreasing non-allocated bandwidth element, e.g., include successively bandwidth for each referred to as X, in the plurality of needed bandwidths, a respective part of a remaining portion of the bandwidth of the proposed route to the bandwidth element X and assigning the traffic of the corresponding class to the proposed route when the remaining portion of the bandwidth of the proposed route is greater than or equal to the bandwidth value of the bandwidth element X.

The method may also include generating at least one further route when the bandwidth of the proposed route is less than the needed bandwidth and dividing the needed bandwidth among all routes generated such that a minimum number of further routes are generated. The plurality of existing paths may carry traffic of a plurality of service classes, the determining step may include determining a plurality of the needed bandwidths corresponding to the plurality of service classes, and the generating step may include, when the bandwidth of the proposed route is less than a given one of a plurality of needed bandwidths, generating at least one further route, dividing the given bandwidth among all routes generated, and assigning the traffic of the corresponding class to the routes generated. The given bandwidth may be the largest bandwidth of the plurality of needed bandwidths. The method may further include allocating a part of a remaining portion of the bandwidth of a selected one of the proposed route and at least one further route to another bandwidth of the plurality of needed bandwidths, and assigning the traffic of the corresponding class to the selected route. The another bandwidth may be the largest one of the remaining non-allocated bandwidths of the plurality of needed bandwidths that has a bandwidth less than or equal to the remaining portion of the bandwidth of the selected route. The method may also include successively allocating, in order of decreasing bandwidth for each non-allocated bandwidth of the plurality of needed bandwidths, a respective part of a remaining portion of the bandwidth of a selected one of the proposed route and the at least one further route to that bandwidth and assigning the traffic of the corresponding class to the selected route when the remaining portion of the bandwidth of a selected route is greater than or equal to that bandwidth.

The method may also include providing available bandwidths and links prior to the generating of a proposed route by determining the respective ones of the plurality of existing paths that traverse each of a plurality of links of the network, determining the reserved bandwidth on each of the plurality of links based on the respective ones of plurality of existing paths that traverse that link, determining the maximum bandwidth on each of the plurality of links, and determining the available bandwidth on each of the plurality of links based on the maximum bandwidth and the reserved bandwidth of that link. The plurality of existing paths may carry traffic of a plurality of service classes, and the determining of the reserved bandwidth, the maximum bandwidth, and the available bandwidth may be carried out for each of the plurality of classes to determine the reserved bandwidth associated with that class on each of the plurality of links, the maximum bandwidth associated with that class on each of the plurality of links, and the available bandwidth associated with that class on each of the plurality of links.

An apparatus of the present invention provides at least one substitute path in place of a plurality of existing paths of a network to reallocate traffic carried by the plurality of existing paths. The apparatus includes a replacement unit operable to: determine the total bandwidth needed to carry the traffic of the plurality of existing paths, generate a proposed route from the available links in the network, and allocate a portion of the bandwidth of the proposed route to the needed bandwidth when the bandwidth of a proposed route is greater than or equal to the needed bandwidth.

In accordance with this apparatus, each of the plurality of existing paths may include at least one failed link. The network may include a multi-protocol label switching (MPLS) network, and the plurality of existing paths and the plurality of substitute paths are each respective pluralities of label-switched paths (LSPs). The proposed route may be the route having the maximum available bandwidth.

The plurality of existing paths may carry traffic of a plurality of service classes, with the replacement unit being operable to determine a plurality of such needed bandwidths corresponding to the plurality of service classes and being operable to allocate the portion of the bandwidth of the proposed route to a given one of the plurality of used bandwidths and to assign the traffic of its corresponding class to the proposed route when the bandwidth of the proposed route is greater than or equal to the given bandwidth. The given bandwidth may be the largest non-allocated bandwidth of the plurality of needed bandwidths.

The replacement unit may be further operable to allocate a part of a remaining portion of the bandwidth of the proposed route to another bandwidth of the plurality of needed bandwidths and to assign the traffic of the corresponding class to the proposed route when the remaining portion of the bandwidth of the proposed route is greater than or equal to the another bandwidth. The another bandwidth may be the largest one of the remaining non-allocated bandwidth of the plurality of needed bandwidths that has a bandwidths less than or equal to the remaining portion of the bandwidth of the proposed route.

The replacement unit may be further operable to successively allocate, in order of decreasing bandwidth for each non-allocated bandwidth of the plurality of needed bandwidths, a respective part of a remaining portion of a bandwidth of the proposed route to that bandwidth and to assign traffic of the corresponding class to the proposed route when the remaining portion of the bandwidth of the proposed route is greater than or equal to that bandwidth.

The replacement unit may be further operable to generate at least one further route when the bandwidth of the proposed route is less than the needed bandwidth and to divide the needed bandwidth among the proposed route and the at least one further route such that a minimum number of further routes are generated. The plurality of existing paths may carry traffic of a plurality of service classes, and the replacement unit may be operable to determine a plurality of such needed bandwidths corresponding to the plurality of service classes and may be further operable to generate the at least one further route when the bandwidth of the proposed route is less than the given bandwidth of the plurality of needed bandwidths, to divide the given bandwidth among the proposed route and the at least one further route, and to assign the traffic of the corresponding class to the proposed route in the at least one further route. The given bandwidth may be the largest bandwidth of the plurality of needed bandwidths.

The replacement unit may be further operable to allocate a part of the remaining portion of the bandwidth of a selected one of the proposed routes and the at least one further route to another bandwidth of the plurality of needed bandwidths, and to assign the traffic of the corresponding class to the selected route. The another bandwidth may be the largest one of the remaining non-allocated bandwidths of the plurality of needed bandwidths that has a bandwidth less than or equal to the remaining portion of the bandwidth of a selected route.

The replacement unit may also be operable to successively allocate, in order of decreasing bandwidth for each non-allocated bandwidth of the plurality of needed bandwidths, a respective part of a remaining portion of the bandwidth of a selected one of a proposed route and the at least one further route to that bandwidth and to assign the traffic of the corresponding class to the selected route when the remaining portion of a bandwidth of the selected route is greater than or equal to that bandwidth.

The replacement unit may additionally be operable to provide available bandwidths and links, prior to being operable to generate a proposed route, that includes being operable to determine for each of a plurality of links of the network, the respective ones of the plurality of existing paths that traverse that link, to determine the reserved bandwidth on each of the plurality of links based on the respective one of the plurality of existing paths that traverse that link, to determine the maximum bandwidth on each of the plurality of links, and to determine the available bandwidth on each of the plurality of links based on the maximum bandwidth and the reserved bandwidth of that link. The plurality of existing paths may carry traffic of a plurality of service classes, with the replacement unit being operable to determine the reserved bandwidth, the maximum bandwidth, and the available bandwidth for each of the plurality of classes by being operable to determine the reserved bandwidth associated with that class on each of the plurality of classes, the maximum bandwidth associated with that class on each of the plurality of links, and the available bandwidth associated with that class on each of the plurality of links.

A recording medium of the invention is recorded with a computer readable program for carrying out a method of providing at least one substitute path in place of a plurality of existing paths of a network to reallocate traffic carried by the plurality of existing paths. The method includes determining the total bandwidth needed to carry the traffic of the plurality of existing paths, generating a proposed route from the available links in the network, and allocating a portion of the bandwidth of the proposed route to the needed bandwidth when the bandwidth of the proposed route is greater than or equal to the needed bandwidth.

In accordance with the above recording medium, each of the plurality of paths may traverse at least one failed link. The network may include a multi-protocol label switching (MPLS) network, and the plurality of existing paths and the plurality of substitute paths may each be respective pluralities of label-switched paths (LSPs). The proposed route may be a route having the maximum available bandwidth.

The plurality of existing paths may carry traffic of a plurality of service classes, the determining step of the method of the computer readable program may include determining a plurality of such needed bandwidths corresponding to the plurality of service classes, and the allocating step of the method may include allocating the portion of the bandwidth of the proposed route to a given one of the plurality of needed bandwidths and assigning the traffic of its corresponding class to the proposed route when the bandwidth of the proposed route is greater than or equal to the given bandwidth.

The given bandwidth may be the largest non-allocated bandwidth of a plurality of needed bandwidths. The above method may further include: allocating a part of a remaining portion of the bandwidth of the proposed route to another bandwidth of the plurality of needed bandwidths and assigning the traffic of the corresponding class to the proposed route when the remaining portion of the bandwidth of the proposed route is greater than or equal to the another bandwidth. The another bandwidth may be the largest one of the remaining non-allocated bandwidths of a plurality of needed bandwidths that has a bandwidth less than or equal to the remaining portion of the bandwidth of the proposed route.

The method of the computer readable program may further include: successively allocating, in order of decreasing bandwidth for each non-allocated bandwidth of the plurality of needed bandwidths, a respective part of a remaining portion of the bandwidth of the proposed route to that bandwidth and assigning the traffic of the corresponding class to the proposed route when the remaining portion of the bandwidth of the proposed route is greater than or equal to that bandwidth.

The method of the computer readable program may also include generating one further route when the bandwidth of the proposed route is less than the needed bandwidth and dividing the needed bandwidth among the proposed route and the at least one further route such that a minimum number of further routes are generated. The plurality of existing paths may carry traffic of a plurality of service classes, the determining step of the recording method may include determining a plurality of such needed bandwidths corresponding to the plurality of service classes, and the step of generating at least one further route of the record method may include generating the at least one further route when the bandwidth of the proposed route is less than a given one of the plurality of needed bandwidths, dividing the given bandwidth among the proposed route and the at least one further route, and assigning the traffic of the corresponding class to the proposed route and the at least one further route. The given bandwidth may be the largest bandwidth of the plurality of needed bandwidths.

The method of the computer readable program may additionally include allocating a part of a remaining portion of the bandwidth of a selected one of the proposed route and the at least one further route to another bandwidth of the plurality of needed bandwidths and assigning the traffic of the corresponding class to the selected route. The another bandwidth may be the largest one of the remaining non-allocated bandwidths of the plurality of needed bandwidths that has a bandwidth less than or equal to the remaining portion of the selected route.

Also, the method of the computer readable program may include successively allocating, in order of decreasing bandwidth for each non-allocated bandwidth of the plurality of needed bandwidths, a respective part of a remaining portion of the bandwidth of a selected one of the proposed route and the at least one further route to that bandwidth and assigning the traffic of the corresponding class to the selected route when the remaining portion of the bandwidth of the selected route is greater than or equal to that bandwidth.

Moreover, the method of the computer readable program may include providing available bandwidths and links prior to the generating of a proposed route by determining, for each of a plurality of links of the network, the respective ones of the plurality of existing paths that traverse that link, determining the reserved bandwidth on each of the plurality of links based on the respective ones of the plurality of existing paths that traverse that link, determining the maximum bandwidth on each of the plurality of links, and determining the available bandwidth on each of the plurality of links based on the maximum bandwidth and the reserved bandwidth of that link. The plurality of existing paths may carry traffic of a plurality of service classes, and the steps of determining the reserved bandwidth, determining the maximum bandwidth, and determining the available bandwidth of the above method may be carried out for each of the plurality of classes to determine the reserved bandwidth associated with that class on each of the plurality of links, the maximum bandwidth associated with that class on each of the plurality of links, and the available bandwidth associated with that class on each of the plurality of links.

According to a further method of the invention, at least one substitute path is provided in place of a plurality of existing paths in a network to reallocate traffic carried by the plurality of existing paths, with the plurality of existing paths carry traffic of a plurality of service classes. The method includes: determining a plurality of needed bandwidths corresponding to the plurality of service classes, each one of the plurality of needed bandwidths including the total bandwidth needed to carry the traffic of the plurality of existing paths for the corresponding service class; generating the proposed route from the remaining available links in the network, the proposed route being the route having the maximum available bandwidth; when the bandwidth of the proposed route is greater than or equal to the largest non-allocated bandwidth of the plurality of needed bandwidths, allocating a portion of the bandwidth of the proposed route to the largest non-allocated bandwidth, assigning the traffic of the corresponding class to the proposed route, and successively allocating, in order of decreasing bandwidth for each remaining non-allocated bandwidth of the plurality of needed bandwidths, a respective part of a remaining portion of the bandwidth of the proposed route to that bandwidth and the traffic of the corresponding class to the proposed route when the remaining portion of the bandwidth of the proposed route is greater than or equal to that bandwidth; when the bandwidth of the proposed route is less than the largest non-allocated bandwidth of the plurality of needed bandwidths, generating at least one further route from the remaining available links in the network, dividing the largest non-allocated bandwidth of the plurality of needed bandwidths among the proposed route and the at least one further route such that a minimum number of further routes are generated, and successively allocating, in order of decreasing bandwidth for each remaining non-allocated bandwidth of the plurality of needed bandwidth, a respective part of a remaining portion of the bandwidth of a selected one of the proposed route and the at least one further route to that bandwidth and assigning the traffic of the corresponding class to the selected route when the remaining portion of the bandwidth of the selected route is greater than or equal to that bandwidth; and repeating the above until all of the plurality of needed bandwidths have been allocated or considered.

In accordance with this method of the invention, the network may include a multi-protocol label switching (MPLS) network, and the plurality of existing paths and the plurality of substitute paths may each be respective pluralities of label-switched paths (LSPs).

The above method may further include determining whether all of the links traversed by the routes of two or more of the plurality of substitute paths are identical, and if so, combining the two or more substitute paths to generate a new substitute path, the bandwidths allocated to each class carried by the new path being the total bandwidth allocated to the two or more substitute paths for that class.

Each of the plurality of existing paths may traverse at least one failed link, and the method may further include determining, when at least one of a plurality of failed paths is again operational, whether one or more of the plurality of replacement paths are no longer needed, and if so, deleting the one or more of the plurality of replacement paths such that the bandwidth allocated to each class from each of the links traversed by the one or more replacement paths is again available.

A further apparatus of the invention provides at least one substitute path in place of a plurality of existing paths of a network to reallocate traffic carried by the plurality of existing paths, with the plurality of existing paths carrying traffic of a plurality of service classes. The apparatus includes a replacement unit operable to determine a plurality of needed bandwidths corresponding to the plurality of service classes, each one of the plurality of needed bandwidths including the total bandwidth needed to carry the traffic of the plurality of existing paths for the corresponding service class; to generate a proposed route from the remaining available links in the network, the proposed route being the route having the maximum available bandwidth; when the bandwidth of the proposed route is greater than or equal to the largest non-allocated bandwidth of the plurality of needed bandwidths, to allocate a portion of the bandwidth of the proposed route to the largest non-allocated bandwidth, to assign the traffic of the corresponding class to the proposed route, and to successively allocate, in order of decreasing bandwidth for each remaining non-allocated bandwidth of the plurality of needed bandwidths, a respective part of a remaining portion of the bandwidth of the proposed route to that bandwidth and assign the traffic of the corresponding class to the proposed route when the remaining portion of the bandwidth of the proposed route is greater than or equal to that bandwidth; when the bandwidth of the proposed route is less than the largest non-allocated bandwidth of the plurality of needed bandwidths, to generate at least one further route from the remaining available links in the network, to divide the largest non-allocated bandwidth of the plurality of needed bandwidths among the proposed route and the at least one further route such that a minimum number of further routes are generated, and to successively allocate, in order of decreasing bandwidth for each remaining non-allocated bandwidth of the plurality of needed bandwidths, a respective part of a remaining portion of the bandwidth of a selected one of the proposed route and the at least one further route to that bandwidth and assign the traffic of the corresponding class to the selected route when the remaining portion of the bandwidth of the selected route is greater than or equal to that bandwidth; and to repeat the above until all of the plurality of needed bandwidths have been allocated or considered.

In accordance with the above apparatus, the network may include a multi-protocol label switching (MPLS) network, and the plurality of existing paths and the plurality of substitute paths may each respective pluralities of label-switched paths (LSPs). The replacement unit may be further operable to generate at least one of the plurality of substitute paths, with the primary path of the substitute path being one of the proposed route and the at least one further route and with the bandwidths allocated to each class carried by the substitute path being the bandwidths allocated to each class for the one of the proposed route and the at least one further route. The replacement unit may be also operable to determine whether all of the links traversed by the routes of two or more of the plurality of substitute paths are identical, and if so, combine the two or more substitute paths to generate a new one of the plurality of substitute paths, with the bandwidths allocated to each class carried by the new path being the total bandwidth allocated to the two or more substitute paths for that class.

Each of the plurality of existing paths may include at least one failed link, and the replacement unit may be further operable to determine, when at least one of the plurality of failed paths is again operational, whether one or more of the plurality of replacement paths are no longer needed, and if so, to delete the one or more of the plurality of replacement paths such that the bandwidth allocated to each class from each of the links traversed by the one or more replacement paths is again available.

A further recording medium of the invention is recorded with a computer readable program for carrying out a method of providing at least one substitute path in place of a plurality of existing paths of a network to reallocate traffic carried by the plurality of existing paths, the plurality of existing paths carrying traffic of a plurality of service classes. The method includes determining a plurality of needed bandwidths corresponding to the plurality of service classes, each one of the plurality of needed bandwidths including the total bandwidth needed to carry the traffic of the plurality of existing paths for the corresponding service class; generating a proposed route from the remaining available links in the network, the proposed route being the route having the maximum available bandwidth; when the bandwidth of the proposed route is greater than or equal to the largest non-allocated bandwidth of the plurality of needed bandwidths, allocating a portion of the bandwidth of the proposed route to the largest non-allocated bandwidth, assigning the traffic of the corresponding class to the proposed route, and successively allocating, in order of decreasing bandwidth for each remaining non-allocated bandwidth of the plurality of needed bandwidths, a respective part of a remaining portion of the bandwidth of the proposed route to that bandwidth and assigning the traffic of the corresponding class to the proposed route when the remaining portion of the bandwidth of the proposed route is greater than or equal to that bandwidth; when the bandwidth of the proposed route is less than the largest non-allocated bandwidth of the plurality of needed bandwidths, generating at least one further route from the remaining available links in the network, dividing the largest non-allocated bandwidth of the plurality of needed bandwidths among the proposed route and the at least one further route such that a minimum number of further routes are generated, and successively allocating, in order of decreasing bandwidth for each remaining non-allocated bandwidth of the plurality of needed bandwidths, a respective part of a remaining portion of the bandwidth of a selected one of the proposed route and the at least one further route to that bandwidth and assigning the traffic of the corresponding class to the selected route when the remaining portion of the bandwidth of the selected route is greater than or equal to that bandwidth; and repeating the above until all of the plurality of needed bandwidths have been allocated or considered.

In accordance with the above method of the computer readable program, the network may include a multi-protocol label switching (MPLS) network, and the plurality of existing paths and the plurality of substitute paths may each be respective pluralities of label-switched paths (LSPs).

The method of the computer readable program may further include generating at least one of the plurality of substitute paths, with the primary path of the substitute path being one of the proposed route and the at least one further route and with the bandwidths allocated to each class carried by the substitute path being the bandwidths allocated to each class for the one of the proposed route and the at least one further route. The above method may further include determining whether all of the links traversed by the routes of two or more of the plurality of substitute paths are identical, and if so, combining the two or more substitute paths to generate a new one of the plurality of substitute paths, with the bandwidths allocated to each class carried by the new path being the total bandwidth allocated to the two or more substitute paths for that class.

Each of the plurality of existing paths may include at least one failed link, and the method of the computer readable program may further include determining, when at least one of the plurality of failed paths is again operational, whether one or more of the plurality of replacement paths are no longer needed, and if so, deleting the one or more of the plurality of replacement paths such that the bandwidth allocated to each class from each of the links traversed by the one or more replacement paths is again available.

According to a still further method of the invention, a plurality of substitute paths are provided in the network in place of a plurality of existing paths in the network to reallocate the traffic carried by the plurality of existing paths among the plurality of substitute paths. The plurality of existing paths carry traffic from an ingress point in the network to an egress point in the network, and the network includes a plurality of links and is capable of carrying traffic for each of a plurality of service classes. Each of the plurality of links is operable to carry traffic for at least one of the plurality of classes at an associated bandwidth. The method includes: providing a list of available bandwidths and links in the network, each element of the list including a respective one of the plurality of links and the available bandwidth for each of the plurality of classes carried on that link; providing a list of desired bandwidths, each element of the list including a respective one of the plurality of classes and an associated bandwidth needed to carry the traffic of that class, the elements of this list being arranged in order of decreasing bandwidth; designating the class corresponding to the current first element in the list of desired bandwidths as the current class, designating the bandwidth associated with the current first element as the current desired bandwidth, and removing the current first element from the list of desired bandwidths such that each of the remaining elements of the list advance one position in the list; generating a current proposed route from the ingress point to the egress point from the list of available bandwidths and links, with the bandwidth of the proposed route being a maximum bandwidth available for carrying the traffic of the current class; determining whether the bandwidth of the proposed route for the current class is greater than or equal to the current desired bandwidth; when the bandwidth of the proposed route is greater than or equal to the current desired bandwidth, assigning the traffic of the current class to the proposed route, allocating a portion of the bandwidth of the proposed route to the current desired bandwidth, reducing the available bandwidth of the links for the current class traversed by the proposed route by the allocated portion, and determining whether for at least another class from the list of desired bandwidths, the bandwidth of the proposed route is able to carry traffic of the at least another class and if so, assigning the traffic of the at least another class to the proposed route, allocating a portion of the bandwidth of the proposed route for the at least another class to the bandwidth associated with the at least another class, and removing at least one corresponding element from the list of desired bandwidths; when the bandwidth of the proposed route is less than the current desired bandwidth, generating a plurality of further routes from the ingress point to the egress point from the list of available bandwidths and links, with each further route being designated to carry a portion of the traffic of the current class and with the current desired bandwidth being divided among the plurality of further routes such that the maximum number of further routes, reducing the available bandwidth of the current class of the links of each of the plurality of further routes by the allocated portion, and determining iteratively for each of the plurality of the proposed routes, whether for at least another class from the list of desired bandwidths, the bandwidth of the current proposed route is able to carry traffic of the at least another class from the list of desired bandwidths, and if so, assigning the traffic of the at least another class to at least one of the plurality of further routes, allocating a further portion of the bandwidth of the at least one further route to the bandwidth associated with the at least another class, and removing at least one corresponding element from the list of desired bandwidths; and repeating the above until all of the elements of the list of desired bandwidths are removed.

A still further apparatus of the invention provides a plurality of substitute paths in the network in place of a plurality of existing paths of a network to reallocate traffic carried by the plurality of existing paths among the plurality of substitute paths, with the plurality of existing paths carrying traffic from an ingress point in the network to an egress point in the network. The network includes a plurality of links and is capable of carrying traffic for each of a plurality of service classes, and each of the plurality of links is operable to carry traffic for at least one of the plurality of classes at an associated bandwidth. The apparatus includes a replacement unit operable to provide a list of available bandwidths and links in the network, with each element of the list including a respective one of the plurality of links and the available bandwidth for each of the plurality of classes carried on that link; to provide a list of desired bandwidths, with each element of the list including a respective one of the plurality of classes and an associated bandwidth needed to carry the traffic of that class and with the elements of this list being arranged in order of decreasing bandwidth; to designate the class corresponding to the current first element in the list of desired bandwidths to be the current class, to designate the bandwidth associated with the current first element to be the current desired bandwidth, and to remove the current first element from the list of desired bandwidths such that each of the remaining elements of the list of desired bandwidths advance one position in the list; to generate, from the list of available bandwidths and links, a current proposed route from the ingress point to the egress point, with the bandwidth of the proposed route being the maximum bandwidth available for carrying the traffic of the current class; to determine whether the bandwidth of the proposed route is greater than or equal to the current desired bandwidth; when the bandwidth of the proposed route is greater than or equal to the current desired bandwidth, to assign the traffic of the current class to the proposed route, to allocate a portion of the bandwidth of the proposed route to the current desired bandwidth, to remove the links of the proposed route from the list of available bandwidths and links; and to determine whether a remaining portion of the bandwidth of the proposed route is able to carry traffic of at least another class from the list of desired bandwidths, and if so, to assign the traffic of the at least another class to the proposed route, to allocate a further portion of the bandwidth of the proposed route to the bandwidth associated with the at least another class, and to remove at least one corresponding element from the list of desired bandwidths; when the bandwidth of the proposed route is less than the current desired bandwidth, to generate a at least another class to the proposed route, to allocate a further portion of the bandwidth of the proposed route to the bandwidth associated with the at least another class, and to remove at least one corresponding element from the list of desired bandwidths; when the bandwidth of the proposed route is less than the current desired bandwidth, to generate a plurality of further routes from the ingress point to the egress point from the list of available bandwidths and links, with each further route being designated to carry a portion of the traffic of the current class and with the current desired bandwidth being divided among the plurality of further routes such that a minimum number of further routes are generated, to remove the links of each of the plurality of further routes from the list of available bandwidths and links, and to determine whether any of the remaining portions of the bandwidths associated with each of the plurality of further routes is able to carry traffic of at least another class from the list of desired bandwidths, and if so, to assign the traffic of the at least another class to at least one of the plurality of further routes, to allocate a further portion of the bandwidth of the at least one further route to the bandwidth associated with the at least another class, and to remove at least one corresponding element from the list of desired bandwidths; and repeating the above until all of the elements of the list of desired bandwidths are removed.

A still further recording medium of the invention is recorded with a computer readable program for carrying out a method of providing a plurality of substitute paths in a network in place of a plurality of existing paths in a network to reallocate traffic carried by the plurality of existing paths among the plurality of substitute paths, with the plurality of existing paths carrying traffic from an ingress point in the network to an egress point in the network. The network includes a plurality of links and being capable of carrying traffic for each of a plurality of service classes, with each of the plurality of links being operable to carry traffic for at least one of the plurality of classes at an associated bandwidth. The method includes: providing a list of available bandwidths and links in the network, with each element of the list including a respective one of the plurality of links and the available bandwidths for each of the plurality of classes carried on that link; providing a list of desired bandwidths, each element of the list including a respective one of the plurality of classes and an associated bandwidth needed to carry the traffic of that class, with the elements of the list being arranged in order of decreasing bandwidth; designating the class corresponding to the current first element in the list of desired bandwidths to be the current class, designating the bandwidth associated with the current first element to be the current desired bandwidth, and removing the current first element from the list of desired bandwidths such that each of the remaining elements of the list of desired bandwidths advance one position in the list: generating, from the list of available bandwidths and links, a current proposed route from the ingress point to the egress point, the bandwidth of the proposed route being the maximum bandwidth available for carrying the traffic of the current class: determining whether the bandwidth of the proposed route is greater than or equal to the current desired bandwidth: when the bandwidth of the proposed route is greater than or equal to the current desired bandwidth, assigning the traffic of the current class to the proposed route, and allocating a portion of the bandwidth of the proposed route to the current desired bandwidth, reducing the available bandwidths of the links traversed by the proposed route by the allocated bandwidth portion, and determining whether a remaining portion of the bandwidth of the proposed route is able to carry traffic of at least another class from the list of desired bandwidths, and if so, assigning the traffic of the at least another class to the proposed route, allocating a further portion of the bandwidth of the proposed route to the bandwidth associated with the at least another class, and removing at least one corresponding element from the list of desired bandwidths: when the bandwidth of the proposed route is less than the current desired bandwidth, generating a plurality of further routes from the ingress point to the egress point from the list of available bandwidths and links, with each further route being designated to carry a portion of the traffic of the current class and with the current desired bandwidth being divided among the plurality of further routes such that a minimum number of further routes are generated, reducing the available bandwidths of the links traversed by each of the plurality of further routes by the allocated bandwidth portion, and determining whether any of the remaining portions of the bandwidths associated with each of the plurality of further routes is able to carry traffic of at least another class from the list of desired bandwidths, and if so, assigning the traffic of the at least another class to at least one of the plurality of further routes, allocating a further portion of the bandwidth of the at least one further route to the bandwidth associated with the at least another class, and removing at least one corresponding element from the list of desired bandwidths; and repeating the above until all of the elements of the list of desired bandwidths are removed.

In accordance with the above method, apparatus and recording medium of the invention, each of the plurality of existing paths may include at least one failed link. The network may include a multi-protocol label switching (MPLS) network, and the plurality of existing paths and the plurality of substitute paths may each be respective pluralities of label-switched paths (LSPs). The plurality of classes may be a plurality of differentiated services (diffserv) classes.

The list of available bandwidths and links may be provided as follows: the plurality of links of the network may be determined, the respective ones of the plurality of existing paths that traverse each of the plurality of links may be determined, the reserved bandwidth associated with each of the plurality of classes may be determined on each of the plurality of links, the determination may be based on the respective one of the plurality of existing paths that traverse that link, the maximum bandwidth associated with each of the plurality of classes may be determined on each of the plurality of links, and the available bandwidth associated with each of the plurality of classes may be determined on each of the plurality of links based on the maximum bandwidth and the reserved bandwidth associated with that class on that link.

Whether a remaining portion of the bandwidth of the proposed route is able to carry traffic of at least another class may be determined as follows: the class corresponding to the current first element of the list of desired bandwidths may be designated to be the current class, the bandwidth corresponding to the current first element of the list of desired bandwidths may be designated to be the current desired bandwidth; whether the remaining portion of the bandwidth of the proposed route is greater than or equal to the current desired bandwidth may be determined; when the remaining portion of the bandwidth of the proposed route is greater than or equal to the current bandwidth, the traffic of the current class is assigned to the proposed route and at least part of the remaining portion of the bandwidth of the current route is allocated to the current desired bandwidth, and the current first element is removed from the list of desired bandwidths so that each of the remaining elements of the list of desired bandwidths advance one position in the list; when the remaining portion of the bandwidth of the current route is less than the current desired bandwidth, the class corresponding to the next highest element on the list of desired bandwidths may be selected to be the current class, and the bandwidth corresponding to the next highest element of the list of desired bandwidths may be selected to be the current bandwidth; and the above repeated until each element of the list of desired bandwidths has been considered.

Whether a remaining portion of the bandwidth associated with each of the plurality of routes is able to carry traffic of at least another class may be determined as follows: one of the plurality of further routes may be selected; the class corresponding to the current first element of the list of desired bandwidths may be designated to be the current class, and the bandwidth corresponding to the current first element of the list of desired bandwidths may be designated to be the current desired bandwidth; whether the remaining portion of the bandwidth of the selected route is greater than or equal to the current bandwidth may be determined; when the remaining portion of the bandwidth of the selected route is greater than or equal to the current desired bandwidth, the traffic of the current class may be assigned to the selected route, at least some of the remaining portion of the bandwidth of the selected route may be allocated to the current desired bandwidth, the current first element may be removed from the list of desired bandwidths so that each of the remaining elements of the list of desired bandwidths advance one position in the list, the class corresponding to the new first element of the list of desired bandwidths may be designated to be the current class, and the bandwidth corresponding to the new first element of the list of desired bandwidths may be designated to be the current desired bandwidth; when the remaining portion of the bandwidth of the selected route is less than the current bandwidth, the class corresponding to the next highest element of the list of desired bandwidths may be designated to be the current class, and the bandwidth corresponding to the next highest element of the list of desired bandwidths may be designated to be the current bandwidth; the above may be repeated until each element of the list of desired bandwidths has been considered; another of the plurality of further routes may be selected when the list of desired bandwidths is not empty, and the above repeated until each of the plurality of further routes has been considered.

One of a plurality of substitute paths may be generated and may have the proposed route as its primary path and the bandwidths associated with each class of the proposed route as its bandwidths or may have a respective one of the plurality of further routes as its primary path and the bandwidths associated with each class of the respective one of the plurality of further routes as its bandwidth. If all of the links traversed by the routes of the two or more of the plurality of substitute paths are identical, the two or more substitute paths may be combined to generate a new one of a plurality of substitute paths that has that route as its primary path and has the combined bandwidth for each respective class of the two or more substitute paths as its bandwidth for that class.

According to another method of the invention, a plurality of replacement label-switch paths (LSPs) are provided in a multi-protocol label switching (MPLS) network in place of a plurality of failed LSPs of the MPLS network to reallocate traffic carried by the plurality of failed LSPs among the plurality of replacement LSPs. The plurality of failed LSPs carry traffic from an ingress point in the MPLS network to an egress point in the MPLS network. The MPLS network includes a plurality of links and is capable of carrying traffic for each of a plurality of differentiated services (diffserv) classes. Each of the plurality of links is operable to carry traffic for at least one of the plurality of diffserv classes at an associated bandwidth. The method includes: providing a list of available bandwidths and links in the MPLS network, with each element of the list including a respective one of the plurality of links and the available bandwidth for each of the plurality of diffserv classes carried on that link; providing a list of desired bandwidths, with each element of the list including a respective one of the plurality of diffserv classes and an associated bandwidth needed to carry the traffic of that diffserv class, and with the elements of this list being arranged in the order of decreasing bandwidth; designating the diffserv class corresponding to the current first element of the list of desired bandwidths to be the current diffserv class, designating the bandwidth associated with the current first element to be the current desired bandwidth, and removing the current first element from the list of desired bandwidths such that each of the remaining elements of the list of desired bandwidths advance one position in the list; generating a current proposed route from the ingress point to the egress point is generated from the list of available bandwidths and links, with the bandwidth of the proposed route being the maximum bandwidth available for carrying the traffic of the current diffserv class; determining whether the bandwidth of the proposed route is greater than or equal to the current desired bandwidth; when the bandwidth of the proposed route is greater than or equal to the current desired bandwidth, assigning the traffic of the current diffserv class to the proposed route, allocating a portion of the bandwidth of the proposed route to the current desired bandwidth, reducing the available bandwidths of the links traversed by the proposed route by the allocated bandwidth portion, and determining whether a remaining portion of the bandwidth of the proposed route is able to carry traffic of at least another diffserv class from the list of desired bandwidths, and if so, assigning the traffic of the at least another diffserv class to the proposed route, allocating a further portion of a bandwidth of the proposed route to the bandwidth associated with the at least another diffserv class, and removing at least one corresponding element from the list of desired bandwidths; when the bandwidth of the proposed route is less than the current desired bandwidth, generating a plurality of further routes from the ingress point to the egress point from the list of available bandwidths and links, with each further route being designated to carry a portion of the traffic of the current diffserv class, dividing the current desired bandwidth among the plurality of further routes such that a minimum number of routes are generated, reducing the available bandwidths of the links traversed by each of the plurality of further routes by the allocated bandwidth portion, and determining whether any of the remaining portions of the bandwidths associated with each of the plurality of further routes is able to carry traffic of at least another diffserv class from the list of desired bandwidths, and if so, assigning the traffic of the at least another diffserv class to at least one of the plurality of further routes, assigning a further portion of the bandwidth of the at least one further route to the bandwidth associated with the at least another diffserv class, and removing at least one corresponding element from the list of the desired bandwidths; and repeating the above until all of the elements of the list of desired bandwidths are removed.

Another apparatus of the invention provides a plurality of replacement label-switched paths (LSPs) in a multi-protocol label switching (MPLS) network in place of a plurality of failed LSPs in the MPLS network to reallocate traffic carried by the plurality of failed LSPs among the plurality of replacement LSPs, with the plurality of failed LSPs carrying traffic from an ingress point in the MPLS network to an egress point in the MPLS network. The MPLS network includes a plurality of links and being capable of carrying traffic for each of a plurality of differentiated services (diffserv) classes, with each of the plurality of links being operable to carry traffic for at least one of the plurality of diffserv classes at an associated bandwidth. The apparatus includes a replacement unit operable to provide a list of available bandwidths and links in the MPLS network, with each element of the list including a respective one of the plurality of links and the available bandwidths for each of the plurality of diffserv classes carried on that link; to provide a list of desired bandwidths, with each element of the list including a respective one of the plurality of diffserv classes and an associated bandwidth needed to carry the traffic of that diffserv class and with the elements of the list being arranged in order of decreasing bandwidth; to designate the diffserv class corresponding to the current first element in the list of desired bandwidths to be the current diffserv class, to designate the bandwidth associated with the current first element to be the current desired bandwidth, and to remove the current first element from the list of desired bandwidths such that each of the remaining elements of the list of desired bandwidths advance one position in the list: to generate, from the list of available bandwidths and links, with a current proposed route from the ingress point to the egress point and with the bandwidth of the proposed route being the maximum bandwidth available for carrying the traffic of the current diffserv class; to determine whether the bandwidth of the proposed route is greater than or equal to the current desired bandwidth; when the bandwidth of the proposed route is greater than or equal to the current desired bandwidth, to assign the traffic of the current diffserv class to the proposed route, to allocate a portion of the bandwidth of the proposed route to the current desired bandwidth, to remove the links of the proposed route from the list of available bandwidths and links, and to determine whether a remaining portion of the bandwidth of the proposed route is able to carry traffic of at least another diffserv class from the list of desired bandwidths, and if so, to assign the traffic of the at least another diffserv class to the proposed route, to allocate a further portion of the bandwidth of the proposed route to the bandwidth associated with to the at least another diffserv class, and to remove at least one corresponding element from the list of desired bandwidths; when the bandwidth of the proposed route is less than the current desired bandwidth, to generate a plurality of further routes from the ingress point to the egress point from the list of available bandwidths and links, with each further route being designated to carry a portion of the traffic of the current diffserv class and with the current desired bandwidth being divided among the plurality of further routes such that a minimum number of further routes are generated, to remove the links of each of the plurality of further routes from the list of available bandwidths and links, and to determine whether any of the remaining portions of the bandwidths associated with each of the plurality of further routes is able to carry traffic of at least another diffserv class from the list of desired bandwidths, and if so, to assign the traffic of the at least another diffserv class to at least one of the plurality of further routes, to allocate a further portion of the bandwidth of the at least one further route to the bandwidth associated with the at least another diffserv class, and to remove at least one corresponding element from the list of desired bandwidths; and to repeat the above until all of the elements of the list of desired bandwidths are removed.

Another recording medium of the invention is recorded with a computer readable program for carrying out a method of providing a plurality of replacement label-switched paths (LSPs) in a multi-protocol label switching (MPLS) network in place of a plurality of failed LSPs in the MPLS network to reallocate traffic carried by the plurality of failed LSPs among the plurality of replacement LSPs, with the plurality of failed LSPs carrying traffic from an ingress point in the MPLS network to an egress point in the MPLS network. The MPLS network includes a plurality of links and is capable of carrying traffic for each of a plurality of differentiated services (diffserv) classes, with each of the plurality of links being operable to carry traffic for at least one of the plurality of diffserv classes at an associated bandwidth. The method includes: providing a list of available bandwidths and links in the MPLS network, with each element of the list including a respective one of the plurality of links and the available bandwidths for each of the plurality of diffserv classes carried on that link; providing a list of desired bandwidths, with each element of the list including a respective one of the plurality of diffserv classes and an associated bandwidth needed to carry the traffic of that diffserv class, the elements of the list being arranged in order of decreasing bandwidth; designating the diffserv class corresponding to the current first element in the list of desired bandwidths to be the current diffserv class, designating the bandwidth associated with the current first element to be the current desired bandwidth, and removing the current first element from the list of desired bandwidths such that each of the remaining elements of the list of desired bandwidths advance one position in the list; generating, from the list of available bandwidths and links, a current proposed route from the ingress point to the egress point, with the bandwidth of the proposed route being the maximum bandwidth available for carrying the traffic of the current diffserv class; determining whether the bandwidth of the proposed route is greater than or equal to the current desired bandwidth; when the bandwidth of the proposed route is greater than or equal to the current desired bandwidth, assigning the traffic of the current diffserv class to the proposed route, allocating a portion of the bandwidth of the proposed route to the current desired bandwidth, reducing the available bandwidths of the links traversed by the proposed route by the allocated bandwidth portion, and determining whether a remaining portion of the bandwidth of the proposed route is able to carry traffic of at least another diffserv class from the list of desired bandwidths, and if so, assigning the traffic of the at least another diffserv class to the proposed route, allocating a further portion of the bandwidth of the proposed route to the bandwidth associated with to the at least another diffserv class, and removing at least one corresponding element from the list of desired bandwidths; when the bandwidth of the proposed route is less than the current desired bandwidth, generating a plurality of further routes from the ingress point to the egress point from the list of available bandwidths and links, with each further route being designated to carry a portion of the traffic of the current diffserv class and with the current desired bandwidth being divided among the plurality of further routes such that a minimum number of further routes are generated, reducing the available bandwidths of the links traversed by each of the plurality of further routes by the allocated bandwidth portion, and determining whether any of the remaining portions of the bandwidths associated with each of the plurality of further routes is able to carry traffic of at least another diffserv class from the list of desired bandwidths, and if so, assigning the traffic of the at least another diffserv class to at least one of the plurality of further routes, allocating a further portion of the bandwidth of the at least one further route to the bandwidth associated with the at least another diffserv class, and removing at least one corresponding element from the list of desired bandwidths; and repeating the above until all of the elements of the list of desired bandwidths are removed.

In accordance with the above method, apparatus and recording medium of the invention, a list of available bandwidths, per diffServ class, on each of the links may be determined as follows: the plurality of links of the MPLS network may be determined, the respective ones of a plurality of LSPs that traverse each of the plurality of links may be determined, the reserved bandwidth associated with each of the plurality of diffserv classes on each of the plurality of links may be determined based on the respective one of the plurality of LSPs that traverse that link, the maximum bandwidth associated with each of the plurality of diffserv classes on each of the plurality of links may be determined, and the available bandwidth associated with each of the plurality of diffserv classes on each of the plurality of links may be determined based on the maximum bandwidth and the reserved bandwidth associated with that diffserv class on that link.

Whether a remaining portion of the bandwidth of the proposed route is able to carry traffic of at least another diffserv class may be determined as follows: the diffserv class corresponding to the current first element of the list of desired bandwidths may be designated to be the current diffserv class, and the bandwidth corresponding to the current first element of the list of desired bandwidths may be designated to be the current desired bandwidth; whether the remaining portion of the bandwidth of the proposed route is greater than or equal to the current desired bandwidth may be determined; when the remaining portion of the bandwidth of the proposed route is greater than or equal to the current desired bandwidth, the traffic of the current diffserv class may be assigned to the proposed route, at least part of the remaining portion of the bandwidth of the current route may be allocated to the current desired bandwidth, and the current first element may be removed from the list of desired bandwidths so that each of the remaining elements of the list of desired bandwidths advance one position in the list; when the remaining portion of the bandwidth of the current route is less than the current desired bandwidth, the diffserv class corresponding to the next highest element of the list of desired bandwidths may be selected to be the current diffserv class, and the bandwidth corresponding to the next highest element of the list of desired bandwidths may be selected to be the current desired bandwidth; and the above repeated until each of the list of desired bandwidths has been considered.

Whether a remaining portion of the bandwidth associated with each of the plurality of routes is able to carry traffic of at least another diffserv class may be determined as follows: one of the plurality of further routes may be selected; the diffserv class corresponding to the current first element of the list of desired bandwidths may be designated to be the current diffserv class and the bandwidth corresponding to the current first element of the list of desired bandwidths may be selected to be the current desired bandwidth; whether the remaining portion of the bandwidth of the selected route is greater than or equal to the current desired bandwidth may be determined; when the remaining portion of the bandwidth of the selected route is greater than or equal to the current desired bandwidth, the traffic of the current diffserv class may be assigned to the selected route, at least some of the remaining portion of the bandwidth of the selected route may be allocated to the current desired bandwidth, the current first element may be removed from the list of desired bandwidths so that each of the remaining elements in the list of desired bandwidths advance one position in the list, the diffserv class corresponding to the new first element of the list of desired bandwidths may be designated to be the current diffserv class, and the bandwidth corresponding to the new first element of the list of desired bandwidths may be designated to be the current desired bandwidth; when the remaining portion of the bandwidth of the selected route is less than the current desired bandwidth, the diffserv class corresponding to the next highest element of the list of desired bandwidths may be designated to be the current diffserv class, and the bandwidth corresponding to the next highest element of the list of desired bandwidths may be designated to be the current desired bandwidth; the above may be repeated until each element of the list of desired bandwidths has been considered; another of the plurality of further routes may be selected when the list of desired bandwidths is not empty; and the above repeated until each of the plurality of further routes has been considered.

One of the plurality of replacement LSPs may be generated and may have a proposed route as its primary path and may have the bandwidths associated with each diffserv class as a proposed route as its bandwidths, or the replacement LSP may have a respective one of a plurality of further routes as its primary path and the bandwidth associated with each diffserv class of the proposed route as its bandwidth. Whether all of the links traversed by the routes of two or more of the plurality of replacement LSPs are identical may be determined, and if so, the two or more replacement LSPs may be combined to generate a new one of a plurality of replacement LSPs having that route as its primary path and having the combined bandwidth for each respective diffserv class of the two or more replacement LSPs as its bandwidth for that class. When at least one of the plurality of failed LSPs is again operational, whether one or more of the plurality of replacement LSPs are no longer needed is determined, and if so, the one or more of the plurality of replacement LSPs are removed and the list of available bandwidths and links are updated to include the links traversed by the one or more replacement LSPs and the bandwidth associated with each diffserv class for each of the included links.

The foregoing aspects, features and advantages of the present invention will be further appreciated when considered with reference to the following description of the preferred embodiments and accompanying drawings.

DETAILED DESCRIPTION

Figure 1:
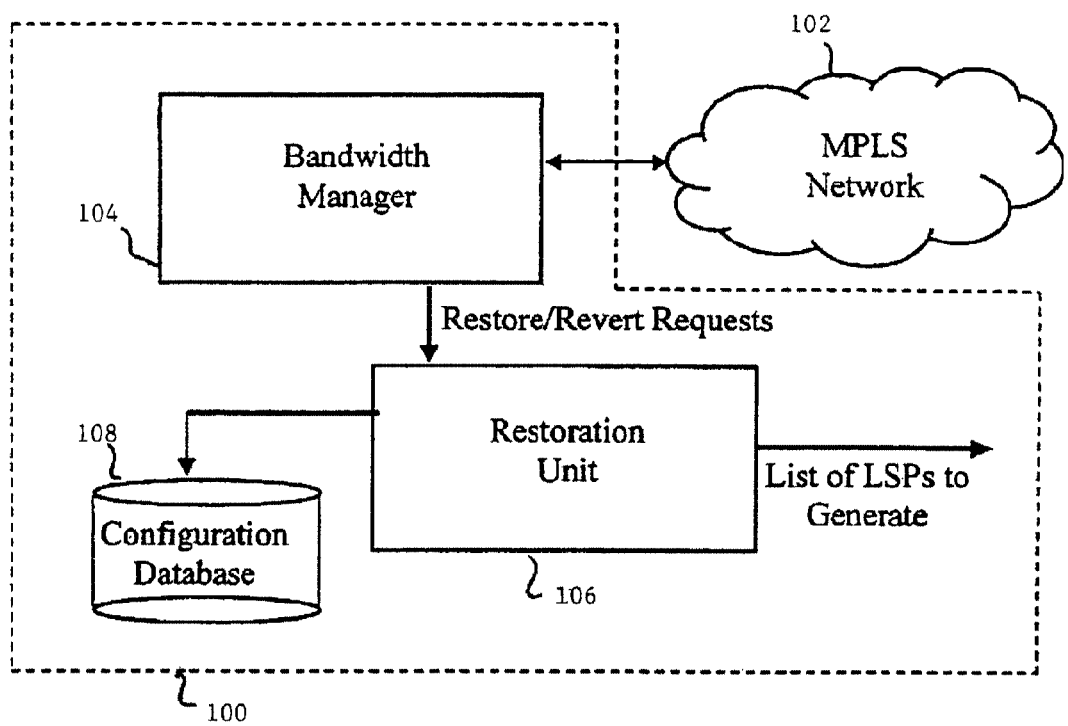
FIG. 1 is a block diagram showing an example of the network management elements that carry out the present invention.

FIG. 1 illustrates an example of the traffic engineering elements 100 used to carry out the operations of a system in accordance with an aspect of the present invention. The elements 100 interact with a network 102, such as a MPLS network having differentiated services (diffserv) capabilities. The traffic engineering elements are located, for example, in a network management system located at a network operation center and may include a bandwidth manager 104, a restoration unit 106 and configuration database 108. The bandwidth manager 104 controls the traffic passing through the network 102 and allocates bandwidth to the particular diffserv classes. The restoration unit 106 controls the substitution of replacement label-switched paths for existing LSPs when a failure occurs in one or more of the LSPs. The configuration database 108 stores the topology, the LSP data and the policies of the network 102. The bandwidth manager 104 and restoration unit 106 preferably comprise software modules operating on a hardware platform. The modules themselves may comprise objects in an object oriented program. Alternatively, the modules may be implemented as a program in the DOS, Windows, Linux or MAC operating system. The program is then stored in memory and executed as instructions by a processor. The configuration database is preferably a memory that may be co-located with bandwidth manager 104 and restoration unit 106. Alternatively, the configuration database may be located remotely from the restoration unit.

In general, the elements 100 may comprise an Operation Support System (OSS) that is used to manage a packet switched network or the like such as, for example, the MPLS network 102. The elements may comprise a stand-alone system or may be integrated into legacy or currently available OSSs. The system may be implemented using a general purpose machine, e.g., using Windows, Linux, etc. The communication between elements 100 and the network 102 may be realized using, e.g., telnet, SNMP, etc. Communications among elements 100 may be realized using, e.g., CORBA, RMI, etc. As an example, the system is implemented using Java, using Telnet to communicate with the network 102, and using CORBA to enable communication among the elements 100.

The network topology includes a list of routers and/or nodes of the network and the links that connect pairs of routers. In addition, for each link, the link ID, the internet protocol (IP) address of the two interfaces connected by the link, the maximum capacity of the link in Mbps, and the failed or operational status of the link are stored. For each router, the router ID and a list of IP addresses of the interfaces of the router are stored. The LSP data includes a list of the LSPs that are setup for the network and includes, for each LSP, the LSP ID, the IP addresses of the A and Z ends, the total reserved bandwidth for each diffserv class supported by the LSP, the path of the LSP, namely, the ordered sequence of links traversed by the LSP, and the setup and holding priorities. The diffserv policies serve to partition the network resources among the supported diffserv classes and include a diffserv class name and a network utilization limit for each of the diffserv classes.

Figure 2:
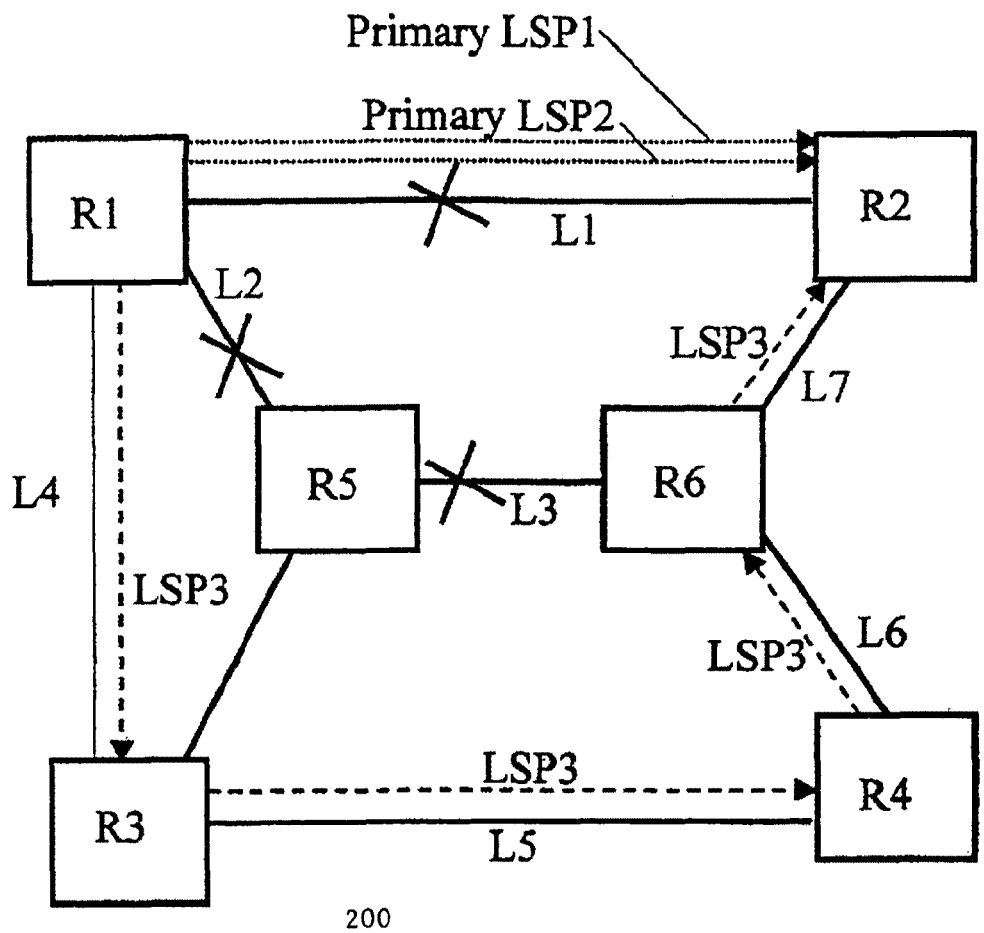
FIG. 2 is a diagram illustrating a portion of a network that includes a path with failed links and showing the links used to form a replacement path in accordance with the invention.

FIG. 2 illustrates an example of a portion of MPLS network 200 and the restoration of network traffic in accordance with an aspect of the present invention when one or more failures occur in the network. The portion of the network shown includes routers R1, R2, R3, R4, R5 and R6 and includes links L1, L2, L3, L4, L5, L6, L7, and L8 each having a 20 Mbps bandwidth capacity as well as link L4 having a 6 Mbps bandwidth capacity. Initially, the network traffic is carried along two LSPs, LSP1 and LSP2, which are routed between router R1 and router R2 over link L1. Path LSP1 is capable of carrying 8 Mbps of traffic, i.e., has a bandwidth of 8 Mbps, but actually carries only 3 Mbps of diffserv class EF traffic, so that 5 Mbps of bandwidth is unused. The path LSP2 also has a bandwidth of 8 Mbps, but carries only 1 Mbps of AF1 traffic so that 7 Mbps of bandwidth is used.

If link L1 fails, current MPLS network restoration schemes attempt to replace LSP1 with a new LSP using links having the same or more bandwidth, 8 Mbps, and also attempt to replace LSP2 with a new LSP likewise using links having a bandwidth of at least 8 Mbps. Thus, each replacement LSP has the same unused bandwidth as the LSP it replaces.

Ordinarily, when link L1 fails, the traffic may be routed along links L2, L3, and L7, which each have a capacity of 20 Mbps and are thus capable of carrying the 16 Mbps of combined bandwidth for the two replacement LSPs. However, if links L2 and L3 also fail, link L4 has a capacity of only 6 Mbps and cannot carry the traffic of even one of the two replacement LSPs. Because traffic cannot be rerouted over L4 because of insufficient bandwidth, the restoration attempt fails.

By contrast, the present invention restores the failed traffic by generating as few replacement LSPs as possible. Here, a new LSP, LSP3, is generated whose path covers the links L4, L5, L6 and L7. The bandwidth of LSP3 is only the total bandwidth actually used by LSP1 and LSP2 so that LSP3 has a bandwidth of only 4 Mbps. Therefore, LSP3 is able to include link L4.

Figure 3:
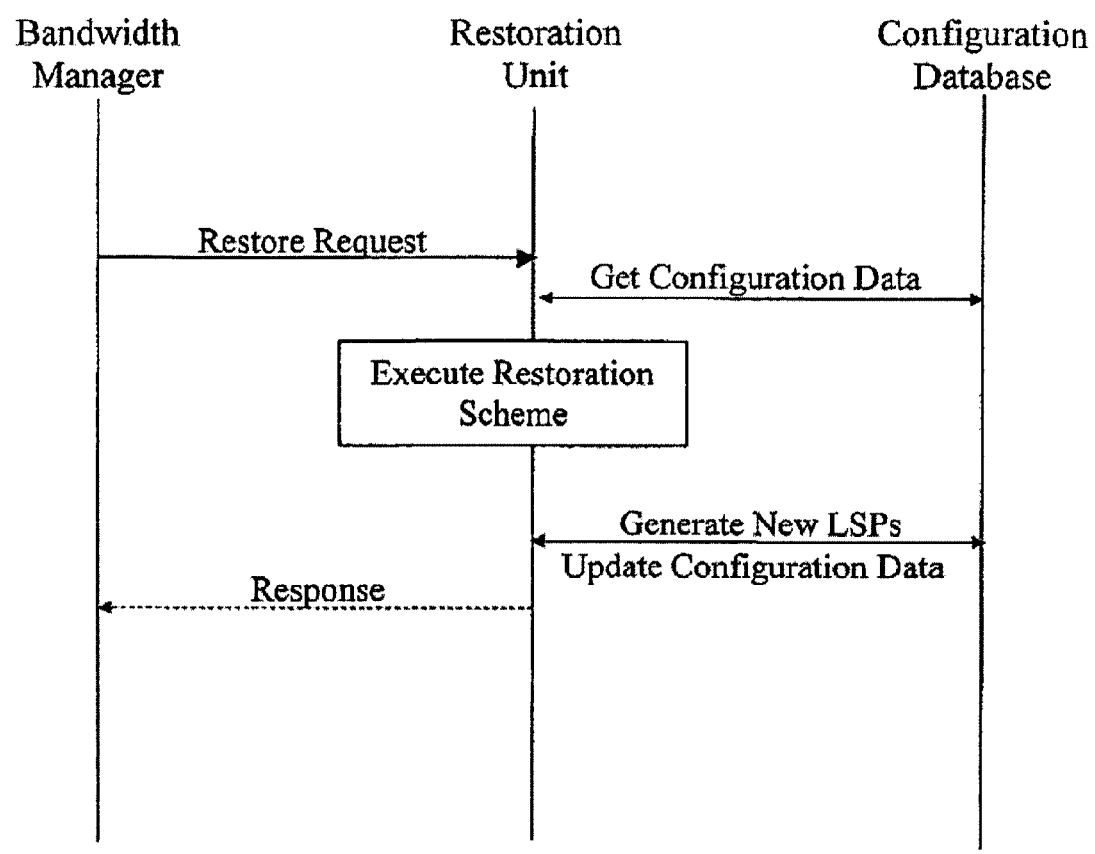
FIG. 3 is a diagram illustrating a sequence of commands and responses that are generated according to the invention to restore service when a portion of a network has failed.

FIG. 3 illustrates an example of the messaging carried out between the bandwidth manager 104, the restoration unit 106 and the configuration database 108 shown in FIG. 1 to carry out the restoration of one or more failed LSPs according to the invention. First, the bandwidth manager detects a failure of one or more LSPs of the MPLS network 102. The bandwidth manager sends a request to the restoration unit that begins the restoration scheme, i.e., the process of generating replacement LSPs in place of the failed LSPs. The restoration unit then transmits a request to the configuration database to obtain the configuration data of the network, and the configuration database delivers such data to the restoration unit. Next, the restoration scheme of the invention is executed, and new LSPs are generated. The restoration unit then transmits information concerning the new LSPs to the configuration database to update the configuration data. Thereafter, the restoration unit transmits a response to the bandwidth manager indicating whether the network was successfully restored.

Figure 4:
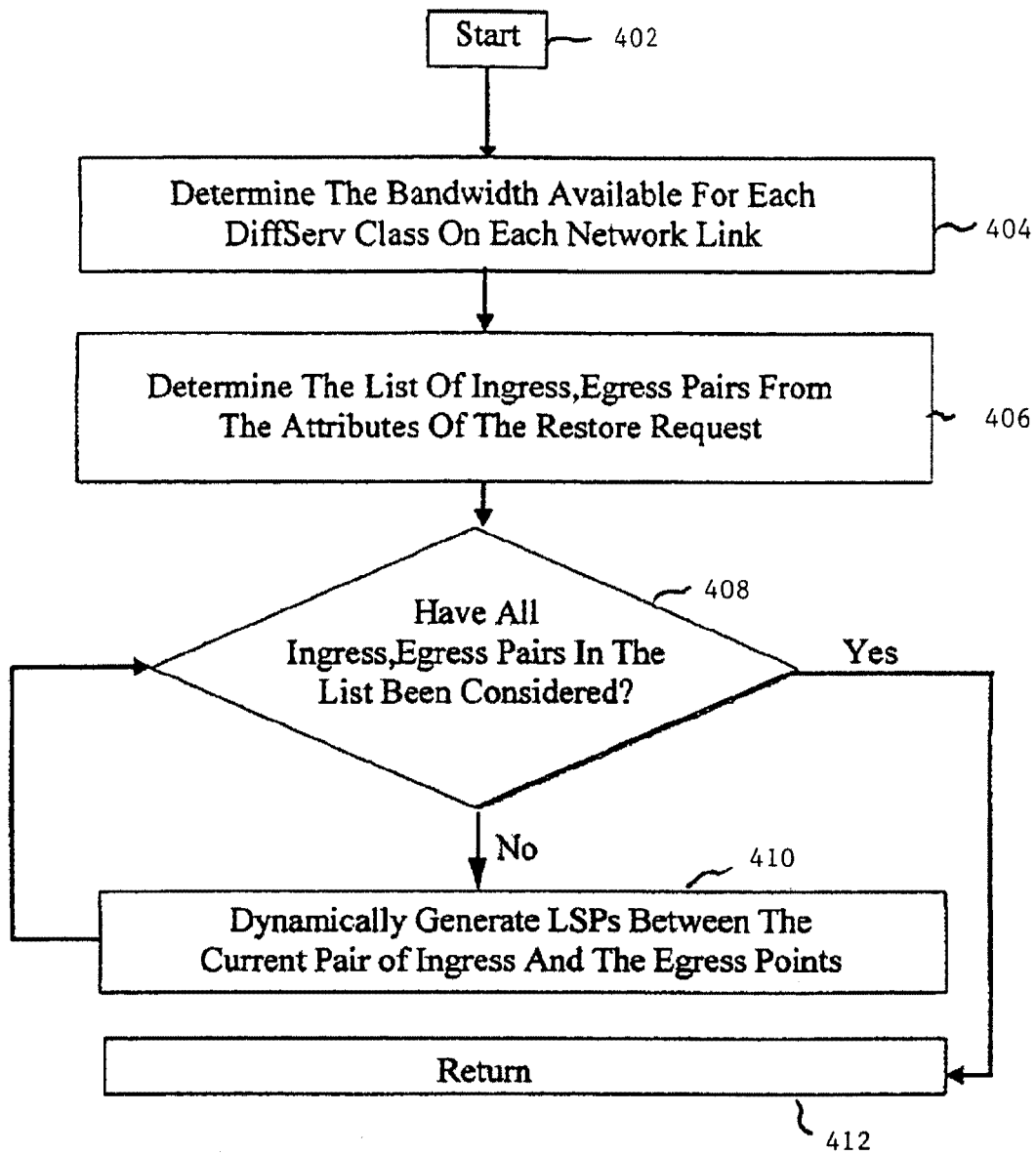
FIG. 4 is a diagram illustrating a flow of operations that are carried out to generate replacement paths according to the invention in response to a failure of a portion of a network.

An overview of the network restoration according to the present invention is shown in FIG. 4. First, restoration is initiated when the restoration unit receives the restore request from the bandwidth manager and starts the restoration scheme, as step 402 shows. The restore request may include the following attributes: a list of failed traffic where each element is in the form of (ingress, egress, diffServ class, bandwidth), a list of failed links, and a list of LSPs, called rerouted LSPs, with their new paths that the MPLS network has rerouted in response to the failure. Then, after acquiring the network configuration data from the configuration database, the list of failed links, and the list of rerouted LSPs the restoration unit determines the current state of the MPLS network, namely, the bandwidth available for each diffserv class on each link in the network is determined, as step 404 shows. Then, a list of the pairs of ingress and egress points which have one or more failed LSPs traversing between them are determined using the list of failed traffic attributes of the restore request, as step 406 shows.

Next, as steps 408 and 410 show, one or more replacement LSPs are dynamically generated between each pair of ingress and egress points until all of the ingress/egress pairs in the list have been considered. Once all the ingress and egress ports have been considered, the restoration then terminates, as shows at step 412.

FIGS. SA-SF are flow diagrams illustrating in greater detail the dynamic generation of replacement LSPs between a given pair of ingress and egress points. An example of the computation carried out for the dynamic generation, as well as the inputs, outputs and variables used, is shown in Tables 1 and 2. First, as shown at step 502, a list of the available bandwidths on each link for each diffserv class is provided.

Figure 6:
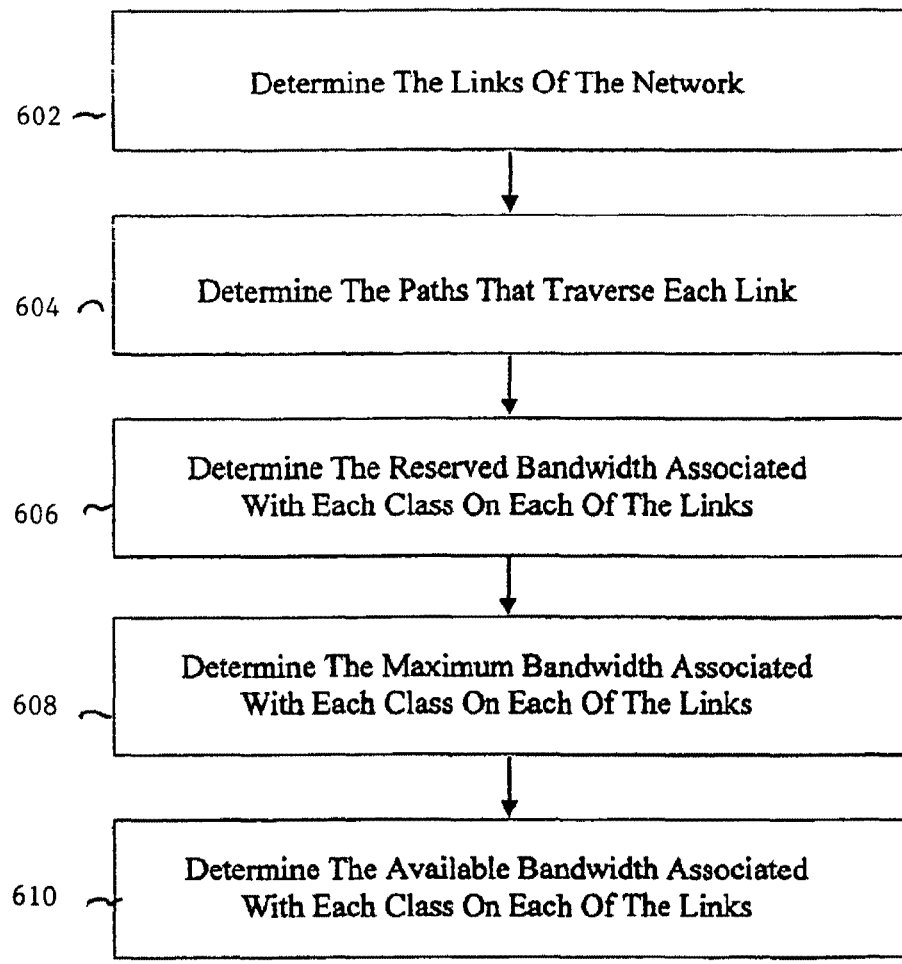
FIG. 6 is a flow diagram illustrating the operations carried out to form the lists of available bandwidths and links in the network shown in FIG. 5A.

FIG. 6 is a flow diagram illustrating in greater detail the determination of the list of available bandwidths referred to in step 404. First, as step 602 shows, a list of all non-failed links in the network is generated. Then, as shown at step 604, a list of the LSPs that traverse each of the links is determined. Next, the reserved bandwidth associated with each diffserv class is determined for each of the non-failed links, as step 606 shows, using the list of LSPs to determine the bandwidth occupied by links traversed by each such LSP. Then, as shown at step 608, the maximum capacity of each link and the network utilization limits are used to determine the maximum bandwidth capacity available for each diffserv class on each link. Thereafter, the reserved bandwidth associated with each diffserv class on each link is subtracted from the maximum available bandwidth associated with that class for that link to determine the available bandwidth associated with each diffserv class for each link, as step 610 shows.

Then, referring back to FIG. 5A as shown at step 504, a list of the total desired bandwidths for each diffserv class is determined based on the bandwidths carried for each diffserv class by each of the failed LSPs. The list is then preferably arranged in order of decreasing bandwidth so that the first element in the list contains the diffserv class that requires the greatest total bandwidth as well as its required bandwidth, the next element contains the diffserv class having the next highest total required bandwidth as well as its bandwidth, etc., until the last element contains the diffserv class requiring the least bandwidth as well as its bandwidth. Advantageously, the list of desired bandwidths is arranged in order of decreasing bandwidth so that the first replacement LSPs that are generated to carry the traffic of the diffserv class requiring the highest bandwidth. Typically, the routes generated to carry this diffserv class are also suitable for accommodating the bandwidths of other diffserv classes. Thus, the generation of replacement LSPs in this manner results in fewer LSPs being produced.

Next, as step 506 shows, it is determined whether the list of desired bandwidths is not empty. If so, a current diffserv class is defined as the diffserv class of the first element in the list of desired bandwidths, and a current desired bandwidth is defined as the bandwidth contained in the first element of this list, as shown in step 508. Next, as step 510 shows, the first element of the list of desired bandwidths is removed, and the remaining elements in the list are advanced one position so that the second element in the list is now the first element, the third element in the list is now the second element, etc. Then, as step 512 shows, a proposed route is generated from the list of links and their available bandwidths. The proposed route has the maximum bandwidth available for the current diffserv class, namely, the diffserv class of the now deleted first element of the list of desired bandwidths. The proposed route may be generated, for example, by a variant of the known Dijkstra's algorithm where the "cost" parameter is defined as the available bandwidth. An example of such a computation and the related inputs, outputs, variables, initializations and functions are shown in Tables 3 and 4.

Figure 5A:
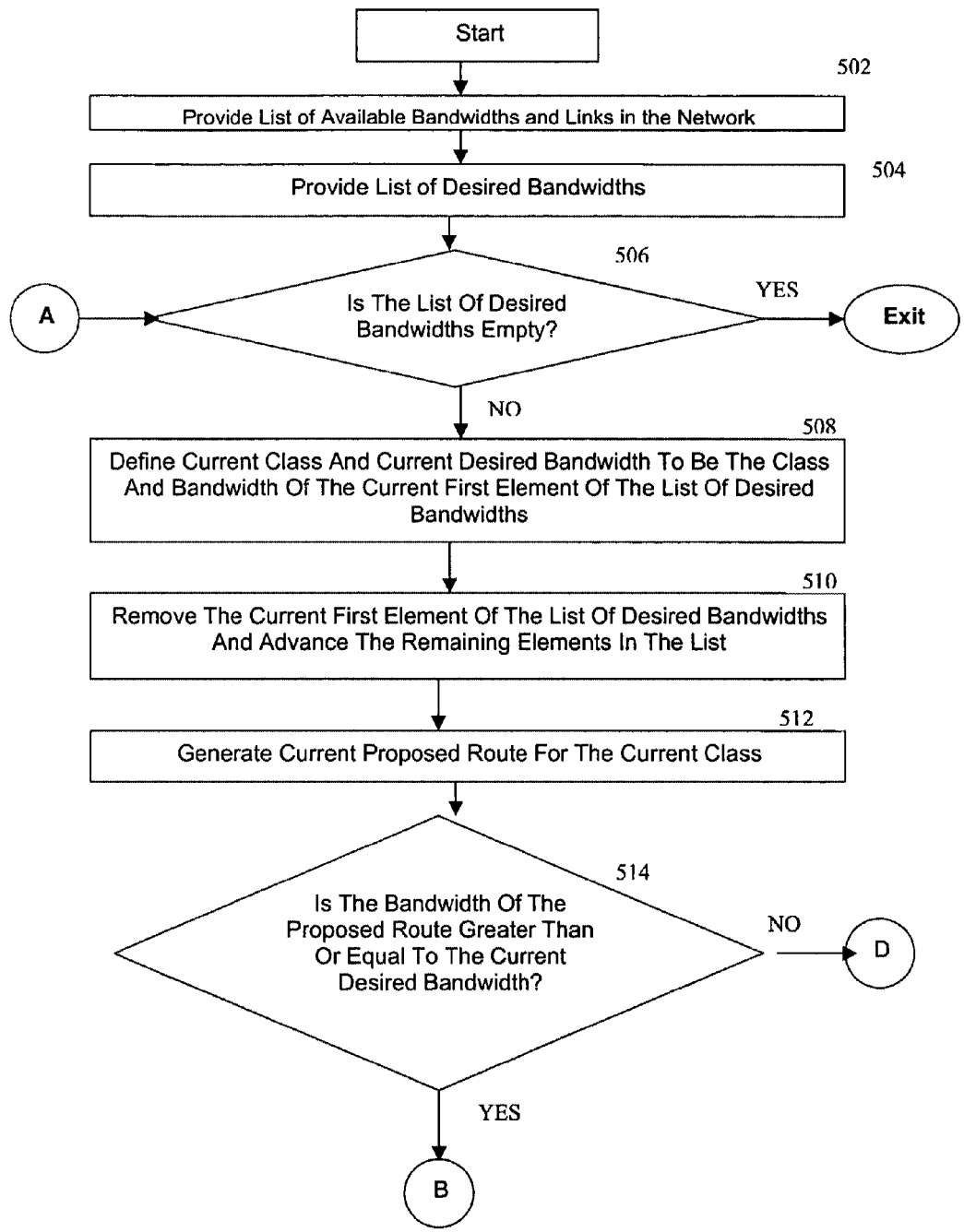
FIGS. 5A-5F are diagrams illustrating the flow of operations for dynamically generating the replacement paths of FIG. 4.
Figure 5B:
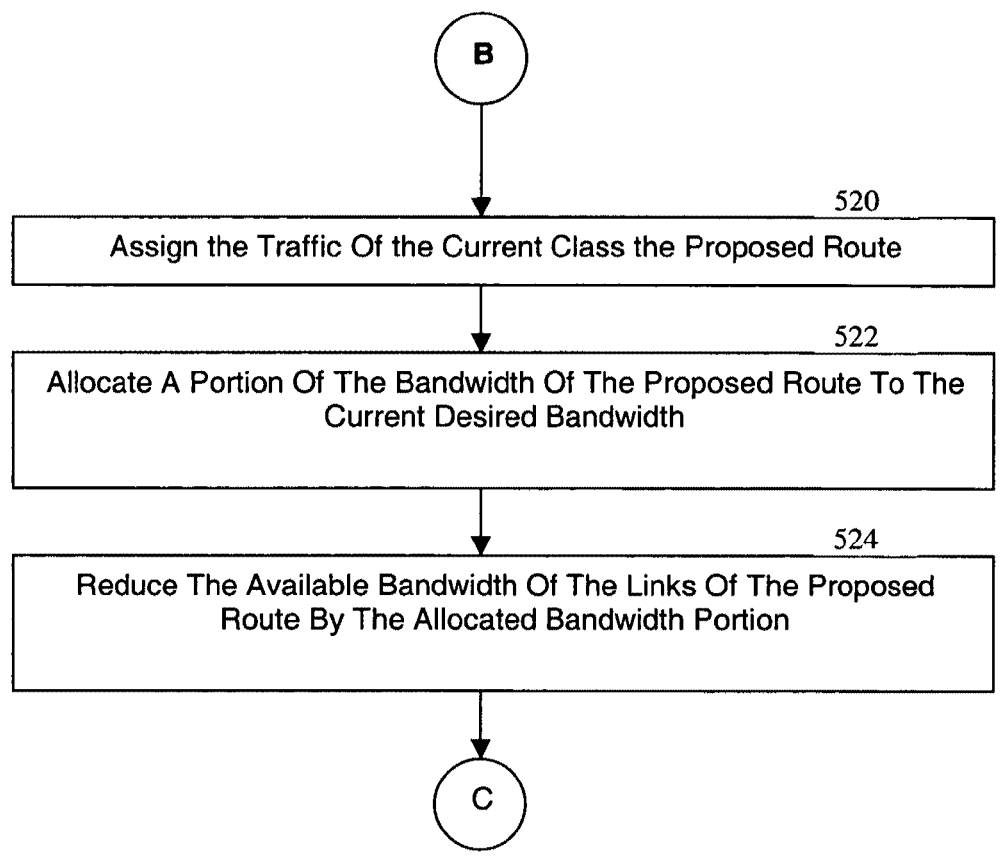

Referring now to FIG. 5B, when the bandwidth of the proposed route is greater than or equal to the current desired bandwidth, namely, when the bandwidth of the proposed route is at least equal to the bandwidth needed by the diffserv class of the removed first element of the list of desired bandwidths, the proposed route is able to carry the traffic of the current class. The traffic of the current class is then assigned to the proposed route, as step 520 shows. A portion of the bandwidth available to the proposed route is allocated for the bandwidth needed by the current class, namely, for the current desired bandwidth, as step 522 shows. The available bandwidth of the links traversed by the proposed route is reduced by the allocated bandwidth portion, as shown at step 524.

Figure 5C:
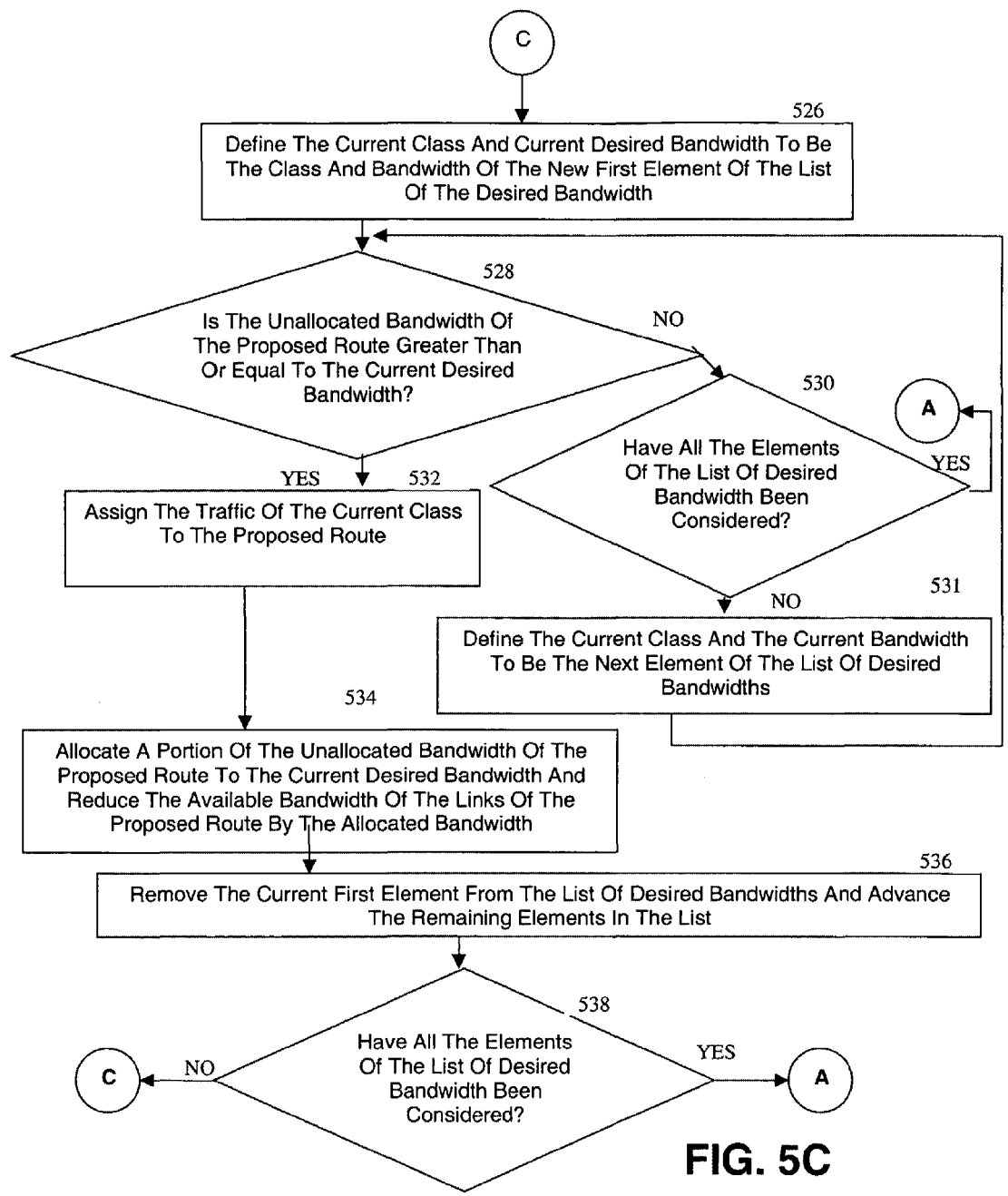

FIG. 5C illustrates the subsequent determination of whether a remaining portion of a bandwidth of the proposed route is able to carry traffic of one or more further classes from the list of desired bandwidths. As step 526 shows, the current class is now defined to have the value of the diffserv class of the new first element of the list of desired bandwidths, and the current desired bandwidth is now defined to be the bandwidth associated with the first element. Then, as shown at step 528, it is determined whether the available bandwidth on the proposed route, for the new current class now defined, is at least equal to the current desired bandwidth. If so, the proposed route is also assigned the traffic of the new current class. In particular, the proposed route is assigned the traffic of the diffserv class of the new first element of the list of desired bandwidths, as shown at step 532, and a portion of the unallocated bandwidth of the proposed route is now allocated for the bandwidth associated with that diffserv class, as shown at step 534. The available bandwidths for the links of the proposed route are reduced by the allocated portion of the bandwidth. Then, the present first element of the list of desired bandwidths is deleted, and the remaining elements in the list are advanced one position so that the original third element in the list is now the first element in the list.

Alternatively, when, at step 528, the remaining unallocated bandwidth of the proposed route is determined to be less than the current desired bandwidth, it is then determined whether all of the elements in the list of desired bandwidths have been considered for the current proposed path, as shown at step 530. When all of the elements in the list of desired bandwidths have been considered for the current proposed path, the process returns to step 506 shown in FIG. 5A. Alternatively, when not all of the elements in the list of desired bandwidths have been considered for the current proposed path, the current class and the current desired bandwidth are now defined to have the value of the class and the bandwidth of the current second element of the list of desired bandwidths, as step 531 shows, and the determination carried out at step 528 is repeated. When the remaining unallocated bandwidth of the proposed route is determined, at step 528, to be at least equal to the current desired bandwidth, steps 532, 534 and 536 are repeated as described above. Alternatively, when the remaining unallocated bandwidth of the proposed route is determined, at step 528, to be less than the current desired bandwidth, steps 530 and 531 are repeated so that the current class and the current desired bandwidth are now defined to have the values of the class and bandwidth the current third element of the list, and the determination at step 528 is again carried out.

The above steps of FIG. 5C are repeated until all the elements of the list of desired bandwidths are considered, as step 538 shows, namely, the diffserv class and the associated bandwidth of each element of the list of desired bandwidths has either (i) been assigned to the proposed route and deleted from the list or (ii) has not been assigned to the proposed route and remains in the list but has been considered.

Figure 5D:
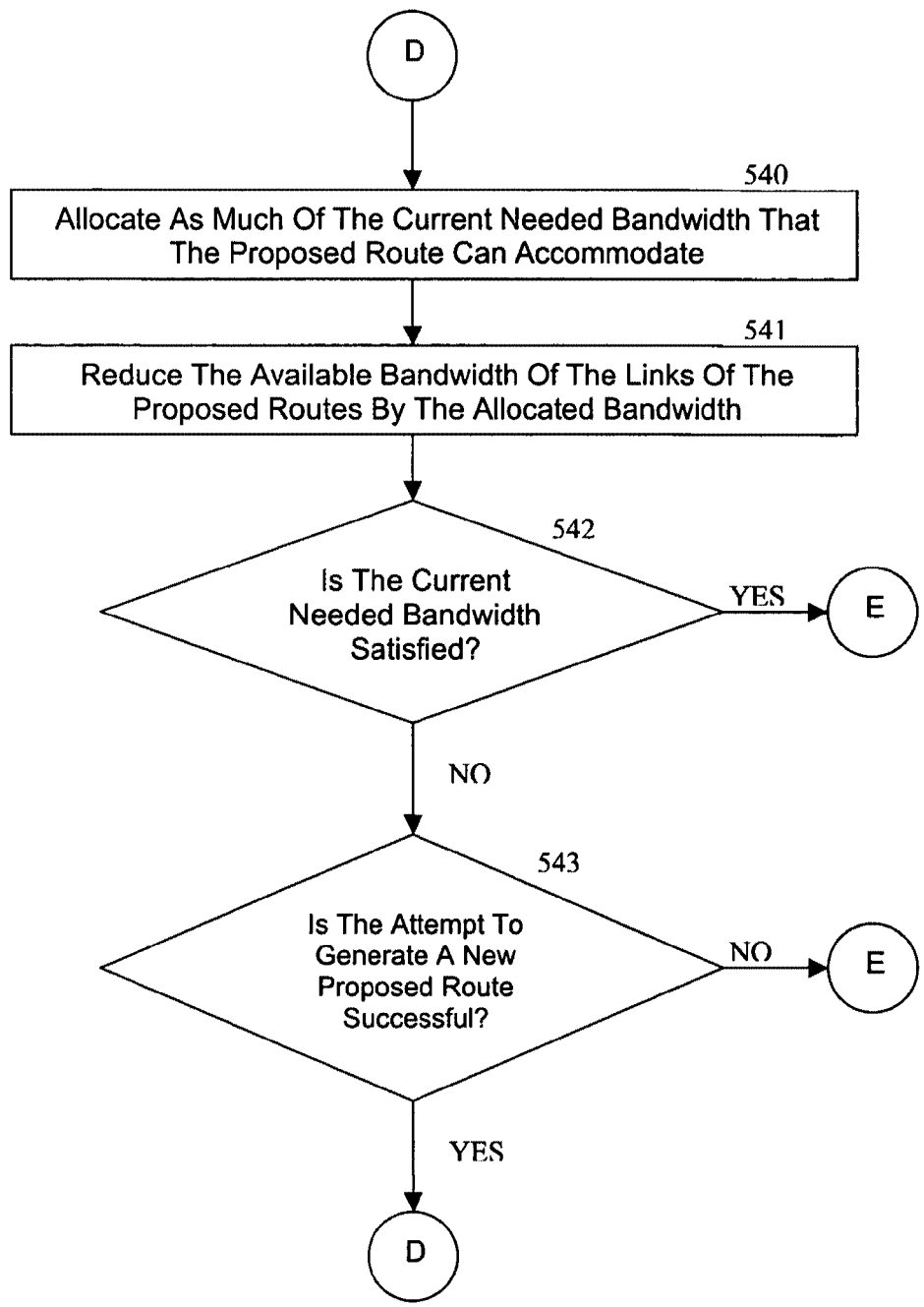

FIG. 5D illustrates the operations carried out when the determination carried out at step 514 of FIG. 5A finds that the bandwidth of the proposed route is less than the bandwidth associated with the current desired bandwidth, namely, the bandwidth associated with the prior first element of the list of available bandwidths. First, as step 540 shows, the proposed route is allocated as much of the current bandwidth as it can accommodate. Then, as shown at step 541, the available bandwidths on the links of the proposed route are reduced by the allocated portion of the bandwidths. Next, as step 542 shows, it is determined whether the current needed bandwidth is satisfied. When the current needed bandwidth is fulfilled, the process advances to step 546 in FIG. 5E. When the current needed bandwidth is not fulfilled, an attempt is made to generate a new proposed route, as shown in step 543. If the attempt to generate a new proposed route is successful, steps 540, 541 and 542 are repeated, and if the attempt to generate a new proposed route fails, such as because of a lack of available bandwidth, the current needed bandwidth is deemed to be fulfilled with the bandwidth been allocated so far, and the process then advances to step 546 shown in FIG. 5E.

Figure 5E:
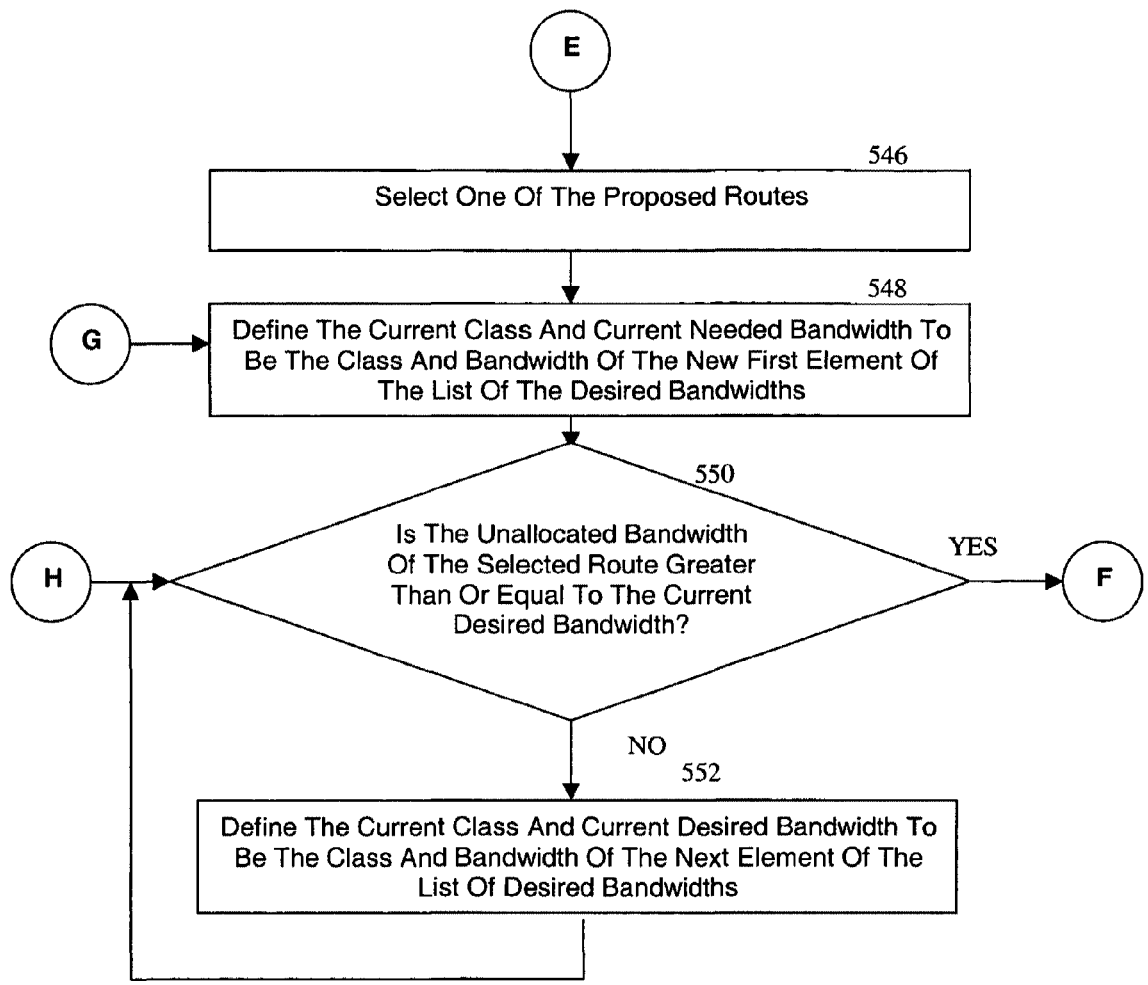
Figure 5F:
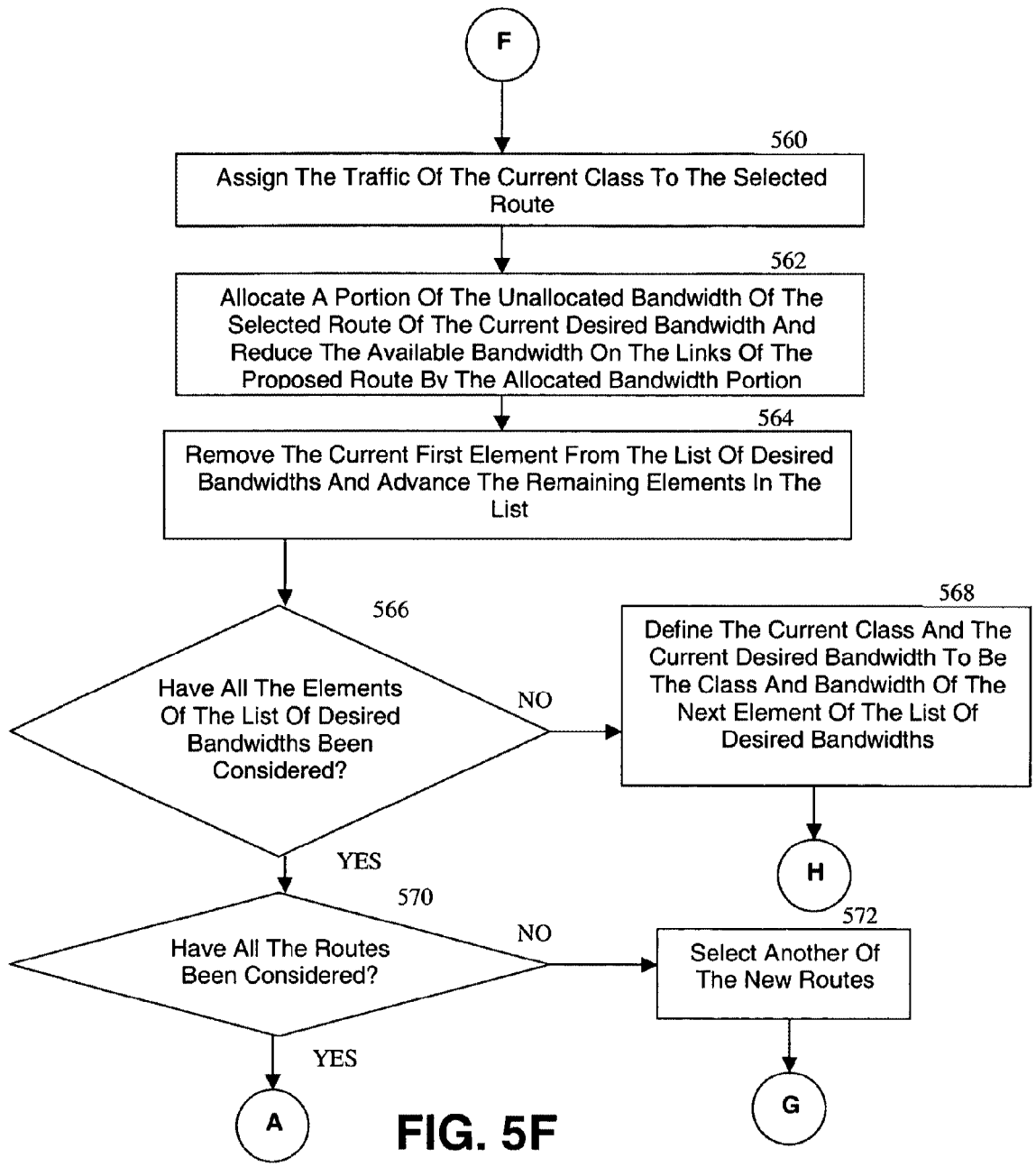

FIGS. 5E and 5F illustrate the subsequent determination of whether any of the remaining elements of desired bandwidths can be carried over the new routes that are generated in the manner described above. As step 546 shows, one of the new routes is selected, and the current class and the current needed bandwidth are then defined as the class contained in the now first element of the list of desired bandwidths and its associated bandwidth, as step 548 shows. The remaining available bandwidth of that route for the current class is compared to the current desired bandwidth, as shown in step 550. When the available bandwidth of that route is greater than or equal to the current desired bandwidth, the traffic of the current class is assigned to the route, as step 560 shows. The current desired bandwidth is allocated to the route, and the available bandwidth on the links of the route are reduced by allocated portion of the bandwidth, as step 562 shows. The first element of the list of desired bandwidths is then removed from the list of desired bandwidths, and the remaining elements in the list advance one position, as step 564 shows. Then, when any elements remain in the list of desired bandwidths, as step 566 shows, the values of the current class and the current bandwidth are again defined in the above manner, as step 568 shows, and step 550 is repeated for the new current class and current bandwidth.

Alternatively, when the remaining available bandwidth of the route is less than the current desired bandwidth, the values contained in the next element in the list of desired bandwidths are redefined as the current class and the current desired bandwidth, as step 552 shows. The determination shown at step 550 is then repeated, and based thereon, either the above steps 560, 562 and 564 are repeated or the above step 552 is repeated until all the elements of the list of desired bandwidths have been considered. Then, when one or more of the new routes have not been considered, another of these routes is selected, and the steps shown in FIGS. 5E and 5F are repeated until all of the new routes have been considered, as steps 570 and 572 show.

Advantageously, the operations shown in FIGS. 4, 5A-5F and 6 generate a minimum number of new LSPs needed to accommodate the failed traffic between each pair of ingress and egress points. Moreover, the restoration is carried out dynamically so that the restoration is carried out each time such a failure occurs.

Further, the operations described above with reference to FIGS. 4, 5A-5F and 6 may be used in other applications that require the dynamic generation of a minimum number of new routes.

Figure 7:
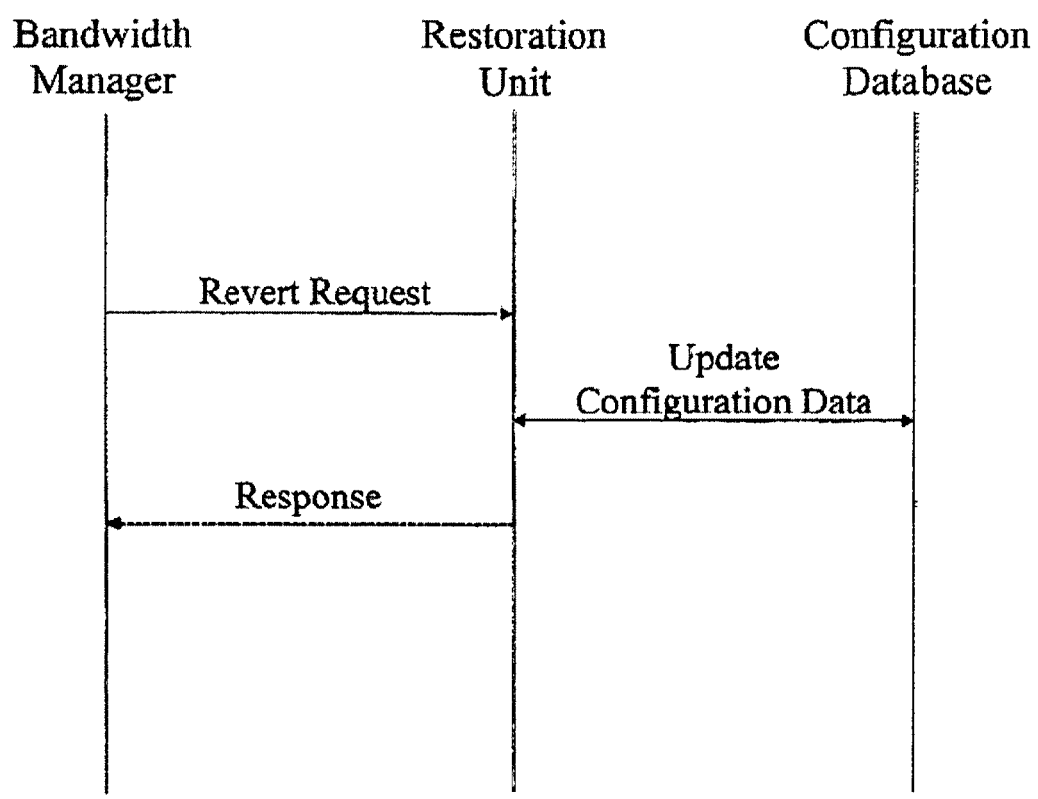
FIG. 7 is a diagram illustrating a sequence of commands and responses that are carried out according to the invention to restore the original network paths after the failed links are returned to service.

Another advantage of the present invention is that after the failed links are restored, the network reverts to its original state, namely, the state of the network prior to the failure of the links, so that the network returns to its previously optimized state. FIG. 7 illustrates an example of the messaging between the bandwidth manager, the restoration unit and the configuration database need to restore the original network. First, the bandwidth manager detects that the links have been restored and issues a revert request to the restoration scheme. The restoration unit then updates the list of bandwidths available for each diffserv class on each link by restoring the links that were traversed by the restoration LSPs and the bandwidths of each diffserv class carried on these links to the list of available bandwidths. The restoration unit then updates the network state, namely, the configuration data stored in the configuration database. Thereafter, the restoration unit sends an indication to the bandwidth manager that the network has been restored to its previous state.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of restoring a network by providing at least one substitute path in place of a plurality of existing paths of a network carrying traffic of a plurality of service classes to reallocate the traffic carried by the plurality of existing paths, said method comprising:

(a) determining total bandwidth needed to carry the traffic of the plurality of existing paths and determining a plurality of needed bandwidths each corresponding to one of the plurality of service classes;

(b) providing a list of the plurality of needed bandwidths in decreasing bandwidth order;

(c) generating a proposed route from available links in the network;

(d) for a greatest non-allocated bandwidth of the plurality of needed bandwidths, if the greatest non-allocated bandwidth is less than or equal to the bandwidth of the proposed route, allocating a portion of the bandwidth of the proposed route to the greatest non-allocated bandwidth, assigning the traffic of the respective service class to the proposed route, removing the greatest non-allocated bandwidth from the list, and defining the next non-allocated bandwidth in the list as a current non-allocated bandwidth;

(e) determining whether the current non-allocated bandwidth is less than or equal to a remaining bandwidth of the proposed route;

(f) if the current non-allocated bandwidth is less than or equal to the remaining bandwidth of the proposed route, allocating a respective part of the remaining portion of the bandwidth of the proposed route to the current non-allocated bandwidth and assigning the traffic of the respective service class to the proposed route, removing the current non-allocated bandwidth from the list, and then if the current non-allocated bandwidth was not the last non-allocated bandwidth in the list remaining to be considered, defining the next non-allocated bandwidth as the current non-allocated bandwidth and returning to action (e);

(g) if the current non-allocated bandwidth is greater than the remaining bandwidth of the proposed route, and if the current non-allocated bandwidth was not the last non-allocated bandwidth in the list remaining to be considered, defining the next non-allocated bandwidth as the current non-allocated bandwidth and returning to action (e); and, (h) when in action (g) the current non-allocated bandwidth was the last non-allocated bandwidth in the list remaining to be considered and the list includes non-allocated bandwidths, returning to action (c).

2. The method according to claim 1, wherein each of the plurality of existing paths includes at least one failed link.

3. The method according to claim 1, wherein the network includes a multi-protocol label switching (MPLS) network, and the plurality of existing paths and the plurality of substitute paths are each respective pluralities of label-switched paths (LSPs).

4. The method according to claim 1, wherein the proposed route is the route having the maximum available bandwidth.

5. The method according to claim 1, wherein:

when in action (d) the greatest non-allocated bandwidth is greater than the bandwidth of the proposed route, the proposed route is defined to be the current proposed route, and the method further comprising:

(i) allocating as much of the bandwidth of the current proposed route to the non-allocated portion of the greatest non-allocated bandwidth as the current proposed route can accommodate; and (j) if not all the greatest non-allocated bandwidth was assigned, generating a new proposed route, defining the new proposed route to be the current proposed route, and returning to action (i).

6. The method according to claim 5, wherein:

once the greatest non-allocated bandwidth is fully assigned, the greatest non-allocated bandwidth is removed from the list, and the method further comprising:

(k) selecting one of the proposed routes;

(l) defining the next non-allocated bandwidth in the list as the current non-allocated bandwidth;

(m) determining whether the current non-allocated bandwidth is less than or equal to the remaining bandwidth of the selected proposed route; and (n) if the current non-allocated bandwidth is less than or equal to the remaining bandwidth of the selected proposed route, allocating a respective part of the remaining portion of the bandwidth of the selected proposed route to the current non-allocated bandwidth and assigning the traffic of the respective service class to the selected proposed route, removing the current non-allocated bandwidth from the list, and then if the current non-allocated bandwidth was not the last non-allocated bandwidth in the list remaining to be considered, defining the next non-allocated bandwidth as the current non-allocated bandwidth and returning to action (m).

7. The method according to claim 6, further comprising:

(o) if the current non-allocated bandwidth is greater than the remaining bandwidth of the selected proposed route, and if the current non-allocated bandwidth was not the last non-allocated bandwidth in the list remaining to be considered, defining the next non-allocated bandwidth as the current non-allocated bandwidth and returning to action (m); and, (p) when in action (o) the current non-allocated bandwidth was the last non-allocated bandwidth in the list remaining to be considered, the list includes non-allocated bandwidths, and not all proposed routes have been considered, selecting a proposed route not yet considered and returning to action (l).

8. The method according to claim 1, further comprising providing available bandwidths and links prior to said generating of a proposed route, and including:

a first determining action to determine, for each of a plurality of links of the network, the respective ones of the plurality of existing paths that traverse each respective link;

a second determining action to determine the reserved bandwidth on each of the plurality of links, the second determination being based on the respective ones of the plurality of existing paths that traverse each respective link;

a third determining action to determine the maximum bandwidth on each respective link; and a fourth determining action to determine the available bandwidth on each respective link, the fourth determination being based on the maximum bandwidth and the respective non-allocated bandwidth of each respective link.

9. The method according to claim 8, wherein the plurality of existing paths carry traffic of a plurality of service classes, said first, second, third, and fourth determining actions are carried out for each of the plurality of classes to subsequently determine the reserved bandwidth associated with that class on each of the plurality of links, the maximum bandwidth associated with that class on each of the plurality of links, and the available bandwidth associated with that class on each of the plurality of links.

10. An apparatus for providing at least one substitute path in place of a plurality of existing paths for a plurality of service classes of a network to reallocate the traffic carried by the plurality of existing paths, said apparatus comprising:
- a replacement unit including software modules operating on a hardware platform configured to:
- determine the total bandwidth needed to carry the traffic of the plurality of existing paths; and,
- further determine a plurality of needed bandwidths each corresponding to one of the plurality of service classes; and,
- execute a process comprising:
  - (a) providing a list of the plurality of needed bandwidths in decreasing bandwidth order;
  - (b) generating a proposed route from available links in the network;
  - (c) for a greatest non-allocated bandwidth of the plurality of needed bandwidths, if the greatest non-allocated bandwidth is less than or equal to the bandwidth of the proposed route, allocating a portion of the bandwidth of the proposed route to the greatest non-allocated bandwidth, assigning the traffic of the respective service class to the proposed route, removing the greatest non-allocated bandwidth from the list, and defining the next non-allocated bandwidth in the list as a current non-allocated bandwidth;
  - (d) determining whether the current non-allocated bandwidth is less than or equal to a remaining bandwidth of the proposed route;
  - (e) if the current non-allocated bandwidth is less than or equal to the remaining bandwidth of the proposed route, allocating a respective part of the remaining portion of the bandwidth of the proposed route to the current non-allocated bandwidth and assigning the traffic of the respective service class to the proposed route, removing the current non-allocated bandwidth from the list, and then if the current non-allocated bandwidth was not the last non-allocated bandwidth in the list remaining to be considered, defining the next non-allocated bandwidth as the current non-allocated bandwidth and returning to action (d);
  - (f) if the current non-allocated bandwidth is greater than the remaining bandwidth of the proposed route, and if the current non-allocated bandwidth was not the last non-allocated bandwidth in the list remaining to be considered, defining the next non-allocated bandwidth as the current non allocated bandwidth and returning to action (d); and,
  - (g) when in action (f) the current non-allocated bandwidth was the last non-allocated bandwidth in the list remaining to be considered and the list includes non-allocated bandwidths, returning to action (b).

11. An apparatus for providing at least one substitute path as in claim 10, wherein each of the plurality of existing paths includes at least one failed link.

12. An apparatus for providing at least one substitute path as in claim 10, wherein the network includes a multi-protocol label switching (MPLS) network, and the plurality of existing paths and the plurality of substitute paths are each respective pluralities of label-switched paths (LSPs).

13. An apparatus for providing at least one substitute path as in claim 10, wherein the proposed route is the route having the maximum available bandwidth.

* * * * *